United States Patent
Shibata et al.

(10) Patent No.: US 7,251,926 B2
(45) Date of Patent: Aug. 7, 2007

(54) GAS TURBINE INSTALLATION

(75) Inventors: Takanori Shibata, Hitachinaka (JP); Shigeo Hatamiya, Hitachi (JP); Nobuhiro Seiki, Hikari (JP); Tomomi Koganezawa, Hitachi (JP); Katsuhiko Sagae, Hitachinaka (JP); Hidefumi Araki, Hitachi (JP)

(73) Assignee: Hitachi, Ltd., Tokyo (JP)

(*) Notice: Subject to any disclaimer, the term of this patent is extended or adjusted under 35 U.S.C. 154(b) by 308 days.

(21) Appl. No.: 10/874,394

(22) Filed: Jun. 24, 2004

(65) Prior Publication Data

US 2005/0097881 A1 May 12, 2005

Related U.S. Application Data

(63) Continuation-in-part of application No. 10/674,402, filed on Oct. 1, 2003, now Pat. No. 6,772,596.

(30) Foreign Application Priority Data

| Jul. 26, 2001 | (JP) | ............................. 2001-225316 |
| Oct. 27, 2003 | (JP) | ............................. 2003-365412 |

(51) Int. Cl.
*F02C 7/10* (2006.01)

(52) U.S. Cl. .................................. 60/39.511; 165/4

(58) Field of Classification Search ........... 60/39.511, 60/39.512; 165/4, 179, 182, 183
See application file for complete search history.

(56) References Cited

U.S. PATENT DOCUMENTS 6,227,287 B1 * 5/2001 Tanaka et al. ............. 165/80.4

FOREIGN PATENT DOCUMENTS

| JP | 61-6594 | * | 1/1986 |
| JP | 1-19053 | | 4/1989 |
| JP | 1-31012 | | 6/1989 |
| JP | 9-236024 | | 9/1997 |
| JP | 9-264158 | | 10/1997 |
| JP | 11-324710 | | 11/1999 |

* cited by examiner

*Primary Examiner*—L. J. Casaregola
(74) *Attorney, Agent, or Firm*—Mattingly, Stanger, Malur & Brundidge, P.C.

(57) ABSTRACT

A plate-fin type regenerative heat exchanger is provided which can prevent clogging of a flow passage caused by a drift of liquid phase water even when compressed air contains a large amount of moisture and liquid droplets. The plate-fin type regenerative heat exchanger comprises a corrugated fin channel for heating compressed air containing liquid droplets and a corrugated fin channel to which the compressed air containing no liquid droplets is supplied. A pitch of fin members of the former corrugated fin channel is set to the Laplace length, whereby bridging of the liquid droplets between the fin members can be prevented.

12 Claims, 15 Drawing Sheets

GAS TURBINE INSTALLATION

CROSS-REFERENCE TO RELATED APPLICATION

This is a continuation-in-part of U.S. patent application Ser. No. 10/674,402 filed on Oct. 1, 2003 based on Japanese Patent Application Number 2001-225316 filed on Jul. 26, 2001, the contents of which are incorporated herein by reference. U.S. patent application Ser. No. 10/674,402 is a divisional of U.S. patent application Ser. No. 10/080,556, filed Feb. 25, 2002, now U.S. Pat. No. 6,718,750.

BACKGROUND OF THE INVENTION

1. Field of the Invention

The present invention relates to a gas turbine installation which utilizes highly humidified air as the combustion use air thereof.

2. Description of the Related Art

For example, JP-B-1-31012 (1989) and JP-A-9-264158 (1997) disclose conventional art gas turbine installation making use of humidified air, in particular, a gas turbine cycle in which compressed air compressed by a compressor and heated liquid phase water being used as heat recovery medium are caused to be contacted at a humidification tower to obtain humidified air (mixture of air/steam) and cooled liquid phase water, with the obtained humidified air heat recovery of turbine exhaust gas is performed as well as by using the obtained cooled liquid phase water as heat recovery medium, heat recovery due to the turbine exhaust gas and intermediate cooling of the compressor are performed, and further, liquid phase water in an amount corresponding to that transferred as steam into the compressed air in the exchange tower (the humidification tower) is supplied to the exchange tower and into the liquid phase served for the heat recovery which is used as cooling medium downstream the intermediate cooler of the compressor which is performed by the cooled liquid phase water obtained at the exchange tower.

Further, JP-B-1-19053 (1989) discloses a gas turbine system in which without using the exchange tower (humidification tower) as disclosed in the above JP-B-1-31012 (1989) and JP-A-9-264158 (1997), with humidified air (mixture of mixed layers of compressed air/water/steam) which is obtained by injecting liquid phase water into outlet air of a compressor, heat recovery of turbine exhaust gas or the heat recovery of the turbine exhaust gas and intermediate cooling of the compressor are performed, and compressed air used for forming the humidified air is cooled in advance by a part of the humidified air.

Still further, JP-A-11-324710 (1999) discloses a humidification method of compressed air supplied from a compressor to a combustor in a gas turbine system in which an atomizer for atomizing water or steam to compressed air flowing through a regenerative heat exchanger is provided in the regenerative heat exchanger.

However, all of the above conventional arts do not sufficiently take into account a problem that scales (precipitates of impurities dissolved in water) caused when water droplets evaporate from a heat transfer surface of a heat exchanger stick on the heat transfer surface, therefore, the conventional art is possibly suffered to problems such as of lowering of heat transfer efficiency and increasing of flow passage pressure loss in a long time span.

When scales stick inside the regenerative heat exchanger, heat resistance of the heat transfer wall surfaces increases which causes to reduce overall heat transfer coefficient and heat transfer efficiency. Further, when scales stick on a narrow flow passage, it is possible that the flow passage is clogged. Still further, when working medium at both a low temperature side and a high temperature side is gas, the heat transfer efficiency thereof is poor in comparison with a case when the work medium is liquid, therefore, the size of a heat exchanger is generally like to be increased. For this reason, a plate-fin type regenerative heat exchanger which is also called as a compact heat exchanger and is constituted by very small flow passages is frequently used as a heat exchanger between gases. When gas containing water droplets are heated by making use of such plate-fin type regenerative heat exchanger, it is necessary to broaden space between heat transfer surfaces so as to avoid clogging, therefore, it was possible to cause problems of reducing heat transfer efficiency of the heat exchanger and increasing the size of the system. Still further, when such plate-fin type regenerative heat exchanger is used, it was required to thicken the plate thickness for countermeasuring erosion caused by liquid droplet collision which also increases the size of the installation.

SUMMARY OF THE INVENTION

An object of the present invention is to provide a compact gas turbine installation which suppresses generation of erosion and scales due to water droplets and shows a high efficiency and a high output.

To achieve the above object, the present invention provides a plate-fin type regenerative heat exchanger for heating humid compressed air containing liquid phase water by combustion exhaust gas, wherein a pitch of fin members forming a flow passage of the compressed air is set to the Laplace length.

Also, according to the present invention, the fin-plate type regenerative heat exchanger comprises a first region for heating the humid compressed air containing liquid phase water and a second region for heating the humid compressed air from which the liquid phase water has evaporated in the first region, and a pitch of fin members installed in the first region is set to the Laplace length.

Further, the pitch of the fin members forming the flow passage of the compressed air and the height of the fin members are set to values sufficient to prevent the liquid phase water contained in the compressed air from bridging between adjacent two of the fin members or tube plates under action of surface tension.

DESCRIPTION OF THE PREFERRED EMBODIMENTS

Figure 1:
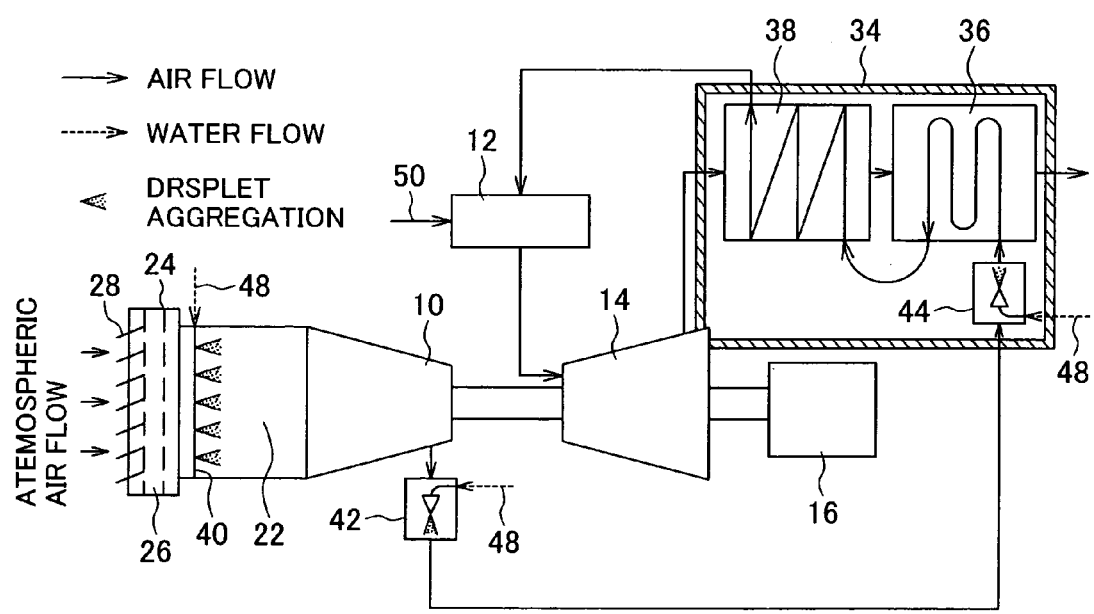
FIG. 1 is a system diagram of a gas turbine installation showing one embodiment of the present invention.

FIG. 1 shows a system diagram of a gas turbine cycle representing one embodiment of the present invention. A gas turbine electric power generation installation of the present embodiment is provided with a compressor 10 which compresses air and discharges the same, a combustor 12 which combusts the compressed air obtained by compression in the compressor 10 and fuel and produces combustion gas, a turbine 14 which is driven by the combustion gas produced in the combustor 12, and a two phase type regenerative heat exchanger 36 and a single phase type regenerative heat exchanger 38 which heat all of or a part of the compressed air supplied from the compressor 10 to the combustor 12 by making use of the heat of the exhaust gas exhausted from the turbine 14. An electric power generator 16 which obtains motive power from an output shaft of the gas turbine 14 and converts the same into electric power is connected to a not shown electric power transmission system. Further, an illustration such as pumps is omitted.

At the upstream side of the compressor 10, an intake air chamber 22 which takes in intake air to be supplied to the compressor 10 is connected. For example, at the intake air side (upstream side) of the intake air chamber 22 an intake air filter chamber 26 in which filters 24 are disposed is arranged, and at the upstream side in the intake air filter chamber 26 louvers 28 are arranged. Further, in the intake air chamber 22 a water spraying device 40 is disposed, and depending on the operating conditions proper moisture content is added into the intake air. Further, in the passage where the compressed air discharged from the compressor 10 reaches the combustor 12 water spraying devices 42 and 44 are disposed which spray water into the compressed air.

An atomizer nozzle, for example, disclosed in JP-A-9-236024 (1997) can be used for the water spraying device 40. In the present embodiment the water spraying device 40 is disposed at the inlet of the compressor 10, for example, in the intake air chamber 22 spaced apart from a first stationary blade. Further, in FIG. 1, the water spraying device 40 is illustrated being disposed downstream the intake air filters 24 in the intake air filter chamber 26. A part or all of moisture content in liquid phase sprayed at the water spraying device 40 is evaporated before entering into the compressor 10, takes out heat contained in the intake air in a from of water evaporation latent heat and reduces the temperature of the intake air. All of or a major part of the remaining liquid droplets is evaporated within the compressor 10 in accordance with the air temperature rise by the compressor 10. In the manner as has been explained, through water spraying into the intake air in the water spraying device 40, the temperature of air to be compressed can be reduced, thereby, a required compressor motive force can be reduced and the output of the turbine 14 can be increased.

At the outlet portion of the compressor 10 or at the nearby position thereof, another water spraying device 42 is disposed. Further, at the inlet portion of the regenerative heat exchanger 36 or the nearby position thereof, still another water spraying device 44 is also disposed. These water spraying devices 42 and 44 spray water to the compressed air (high temperature wetted air) led from the compressor 10 to increase work medium for the turbine 14 and to reduce air temperature.

In the two phase type regenerative heat exchanger 36, exhaust heat recovery in the exhaust gas from the gas turbine 14 is performed by making use of the air containing steam and water droplets added in the upstream water spraying devices 42 and 44. Further, in the single phase type regenerative heat exchanger 38 by making use of the air containing moisture content in gas phase which is formed by fully evaporating the water droplets added at the water spraying device 42 and 44 by the two phase type regenerative heat exchanger 36, the exhaust heat recovery is performed. Through the spraying water in the water spraying devices 42 and 44, the temperature of the air led to the two phase type regenerative heat exchanger 36 and the single phase type regenerative heat exchanger 38 is reduced, thereby, the quantity of recovery heat at the two phase type regenerative heat exchanger 36 and the single phase type regenerative heat exchanger 38 can be increased and heat efficiency of the installation can be improved.

The water spraying devices 40, 42 and 44 include passages of supplying water being sprayed into the air introduced. A make-up water supply device 48 which supplies water to the water spraying device 40, 42 and 44 can be configured to introduce water, for example, from an external system of the concerned gas turbine installation and the associated machines and apparatuses thereof. Alternatively, it can be configured to recover the water from an internal system of the concerned gas turbine installation and the associated machines and apparatuses thereof. Further, alternatively, it can be configured in such a manner that any of the water spraying devices 40, 42 and 44 makes use of the make-up water from the external system and the other primarily makes use of the recovery water. As methods of spraying water into air, such as a method of spraying water droplets against the compressed air stream and a method of feeding water to a structural body facing the passage of the compressed air flow and contacting the same to the compressed air stream.

The water added compressed air by the water spraying devices 42 and 44 is supplied to the two phase type regenerative heat exchanger 38 and the single phase type regenerative heat exchanger 38 which heat the compressed air by making use of the exhaust gas from the gas turbine 14 as the heat source. In the present embodiment, the two phase type regenerative heat exchanger 36 and the single phase type regenerative heat exchanger 38 are formed into an integrated package with a partition wall, however, both can be packaged independently. Further, for the convenience sake, the two phase type regenerative heat exchanger 36 and the single phase type regenerative heat exchanger 38 are respectively illustrated as independent regenerative heat exchangers, however, in an actual machine both can be integrated as a single component.

The two phase type regenerative heat exchanger 36 and the single phase type regenerative heat exchanger 38 are different with regard to the moisture content phase states contained in the compressed air as well as with regard to configuration of the heat transfer surfaces corresponding thereto. For example, a fin and tube structure is used for the heat transfer surface in the two phase type regenerative heat exchanger 36 and a plate-fin structure is used for the heat transfer surface in the single phase type regenerative heat exchanger 38. With the former structure, the cross section of the flow passage where the compressed air passes is large in comparison with that of the later, and since the configuration of the cross section is round, a possible clogging of the flow passage because of scale generation due to water droplet evaporation is low and the cleaning of inside tubes is easy.

Further, for example, when the plate-fin structure is used for the heat transfer surface configurations in both two phase type regenerative heat exchanger 36 and the single phase type regenerative heat exchanger 38, it is sufficient if the space between fins in the two phase type regenerative heat exchanger 36 is selected broader than that in the single phase type regenerative heat exchanger 38. With this measure, even if scales stick on the heat transfer surface, the clogging of the flow passage can be avoided and a performance deterioration can be prevented.

As has been explained above, the heated compressed air by the two phase type regenerative heat exchanger 36 and the single phase type regenerative heat exchanger 38 is supplied to the combustor 12 and is combusted therein together with fuel 50 added to form high temperature combustion gas which drives the turbine 14, and after the heat of the exhaust gas is recovered in the two phase type regenerative heat exchanger 36 and the single phase type regenerative heat exchanger 38 by the compressed air from the compressor 10, the exhaust gas is exhausted into the atmospheric air.

As in the present embodiment, through the use of the heat transfer configuration having a broader flow passage at the compressed air side, for example, the fin and tube structure, for the two phase type regenerative heat exchanger 36 which performs the exhaust heat recovery by means of the air containing water droplets, great many amount of moisture content can be evaporated without caring about the flow passage clogging due to scale sticking.

Further, with respect to the single phase type regenerative heat exchanger 38 which performs exhaust heat recovery by the air containing primarily only steam, by making use of the heat transfer surface configuration having a narrower flow passage width at the compressed air side, for example, the plate-fin structure, the heat transfer surface area per unit length at the low temperature side (compressed air side) and at the high temperature side (heat exhaust side) can be increased, thereby, heat transfer efficiency can be improved, in other words, a compact regenerative heat exchanger with high efficiency can be constituted.

JP-A-11-324710 (1999) discloses a method of enhancing plant efficiency by spraying moisture content at the compressed air side of a regenerative heat exchanger, however, nowhere discloses a heat transfer surface configuration when recovering the exhaust heat by the air containing liquid droplets. When work medium at both lower temperature side and higher temperature side is primarily gas, a regenerative heat exchanger having a plate-fin structure is usually used. In order to improve heat transfer efficiency and compactness of the regenerative heat exchanger, when a heat exchanger having low height and narrow space fins, for example, both height and space are about a few mm is used, scales caused by evaporation of water droplets in the compressed air side stick on the heat transfer surface and which possibly causes clogging. If the height and space of the fins are increased to an extent free from such scale sticking problem, the problem of clogging can be surely resolved, however, a reduction of heat transfer efficiency and a size increase of the regenerative heat exchanger can not be avoided. As in the present embodiment, when the width and height of the flow passage in the regenerative heat exchanger where the work medium at the low temperature side flows are varied depending on existence and absence of liquid droplets in the work medium, a compact and highly efficient regenerative heat exchanger as well as gas turbine installation can be constituted.

Now, locating position and amount of water spray of the water spraying devices 40, 42 and 44 as shown in FIG. 1 will be explained.

As in the present embodiment, in the case of the gas turbine installation in which the exhaust heat recovery is performed by the water added compressed air after leaving the compressor 10, when the amount of moisture content added to the compressed air is increased, the output of the turbine side increases correspondingly and the plant efficiency and output likely increase. Therefore, it is important to evaporate moisture content as much as possible with any means, while avoiding problems such as scale generation and erosion.

In order to evaporate an added water droplet in air, it is necessary that the humidity around the water droplet does not reach saturation and the contacting time of the water droplet with air, in other words, residence time of the water droplet is sufficiently long. The amount of water which can be evaporated into air is determined from water saturation amount which is a function of air temperature, and the higher the air temperature is, the more water can evaporate into the air. In order to increase steam amount which performs exhaust heat recovery inside the two phase type regenerative heat exchanger 36 and the single phase type regenerative heat exchanger 38, it will be conceived to add more water at the water spraying device 40 which locates at the most upstream side in view of the water droplet residence time, however, since the saturation steam amount in the air before heating such as in the compressor 10 and in the two phase type regenerative heat exchanger 36 is less, great part of the added water advects through the inside of the compressor 10 and through the inside of the pipings up to the two phase type regenerative heat exchanger 36 under a condition of liquid droplets. In this instance, since the great part of the moisture content advects in a state of liquid droplets, the liquid droplets collide such as to the compressor blades and the piping members to cause problems of corrosion and erosion, if the diameter of the liquid droplets is not properly controlled, therefore, the above measure is not advantageous.

Contrary, if much water is added near at the outlet of the two phase type regenerative heat exchanger 36 where the air is sufficiently heated to a high temperature, since the amount of saturation steam is large because of high air temperature, the amount of evaporatable steam is much, however, the residence time of the water droplets within the two phase type regenerative heat exchanger 36 is shortened, the liquid droplets are likely exhausted from the two phase type regenerative heat exchanger 36 before completing evaporation thereof, and the rate where the steam is utilized for heat recovery becomes low.

As in the present embodiment, at first an amount of water of which evaporation can be substantially completed within the compressor 10 is added by the water spraying device 40, subsequently another amount of water of which evaporation can be substantially completed before entering into the two phase type regenerative heat exchanger 36 is added to the air heated to a high temperature and pressurized to a high pressure after the compressor 10, finally, still another amount of water of which evaporation can be substantially completed within the two phase type regenerative heat exchanger 36 is added, thereby, further much water is sprayed at the upstream side and further much steam can be utilized in the single phase type regenerative heat exchanger 38 for heat exchange. Moreover, since the amount of water droplets advected in a form of liquid droplets is suppressed as much as possible, thereby, a possible erosion of structural bodies and scale generation are limited.

Further, as a modification, a water spraying device can be disposed at an intermediate position of the flow passage of the compressed air in the two phase type regenerative heat exchanger 36 and further moisture content can be added therewith to the advected compressed air. In this modification, since the compressed air is already heated to a high temperature by the exhaust heat recovery, the saturation steam amount is large, thereby, a further much moisture content can be evaporated further rapidly, which increases the flow rate of the turbine work medium and enhances output and heat efficiency thereof. Further, the amount of liquid droplets advected at the upstream portion in the two phase type regenerative heat exchanger 36 can be decreased, while keeping the amount of steam which contributes for heat exchange within the two phase type regenerative heat exchanger 36, the problems of such as erosion and scale generation in the two phase type regenerative heat exchanger 36 can be lowered which reduces maintenance cost for the gas turbine system.

Figure 2:
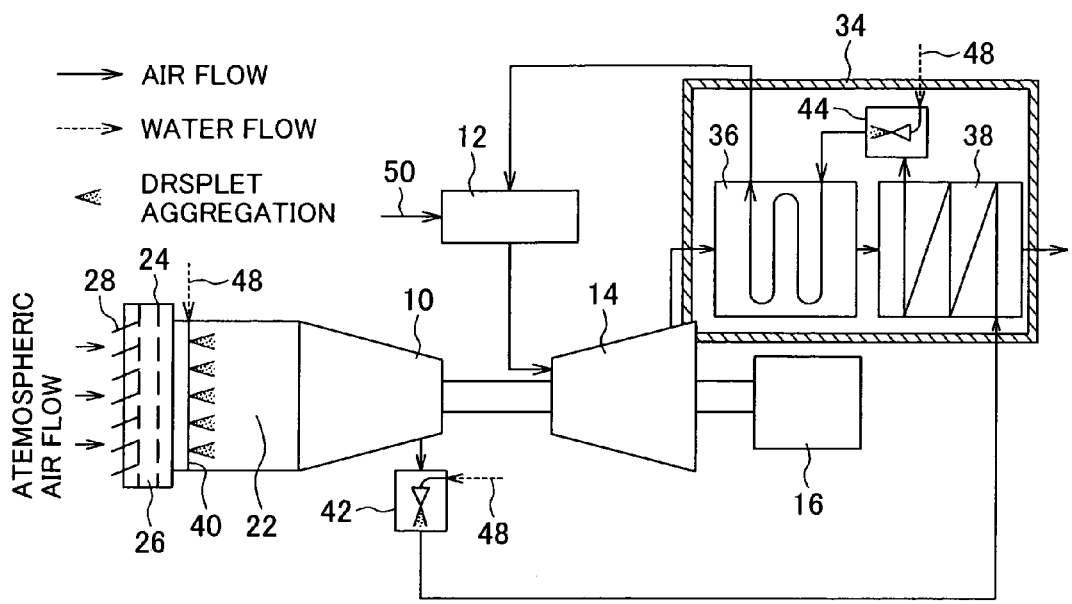
FIG. 2 is a system diagram of a gas turbine installation showing another embodiment of the present invention.

FIG. 2 shows a system diagram of a gas turbine installation representing another embodiment of the present invention. In FIG. 1 embodiment, the two phase type regenerative heat exchanger 36 is arranged at the lower temperature side of the exhaust gas of the gas turbine 14 and the single phase type regenerative heat exchanger 38 is arranged at the high temperature side (at the upstream side of the turbine exhaust gas) of the exhaust gas. However, in the present embodiment as shown in FIG. 2, the two phase type regenerative heat exchanger 36 is arranged at the high temperature side (at the upstream side of turbine exhaust gas) of the exhaust gas, and the single phase type regenerative heat exchanger 38 is arranged at the low temperature side (at the downstream side of the exhaust gas). Further, the water spraying device 44 is arranged so as to spray water into the air supplied to the two phase type regenerative heat exchanger 36 via the single phase type regenerative heat exchanger 38.

In the present embodiment, since water is added to the compressed air which is heated to a further high temperature after being passed through the single phase type regenerative heat exchanger 38, the evaporation speed of the liquid droplets can be increased, thereby, the size of the single phase type regenerative heat exchanger 38 can be reduced.

Further, when a fin and tube structure is used for the two phase type regenerative heat exchanger 36 and a plate-fin structure is used for the single phase type regenerative heat exchanger 38, since the plate thickness of the heat transfer surface of the fin and tube structure is generally thick and structurally strong in comparison with that of the plate-fin structure, if the two phase type regenerative heat exchanger 36 is located at the high temperature side of the exhaust gas of the gas turbine 14, the exhaust gas temperature of the gas turbine 14 can be raised which is generally limited by the material strength of the adjacent regenerative heat exchanger. Accordingly, under the condition that the exhaust heat temperature of a gas turbine installation is limited by the material strength limitation of the regenerative heat exchanger, through arranging the two phase type regenerative heat exchanger 36 at the high temperature side of the exhaust gas and the single phase type regenerative heat exchanger 38 at the low temperature side, the exhaust heat temperature of the gas turbine 14 can be increased and a total plant efficiency can be enhanced, when constituting a regenerative cycle in such a manner.

Further, at the downstream side of the water spraying device 42 and into a flow passage which supplies the compressed air by the compressor 10 to the single phase type regenerative heat exchanger 38, if a structural body for accelerating evaporation of the added liquid droplets at the water spraying device 42 is disposed, the compressed air can be supplied to the single phase type regenerative heat exchanger 38 under a condition that the liquid droplets sprayed into the air are surely evaporated.

Figure 3:
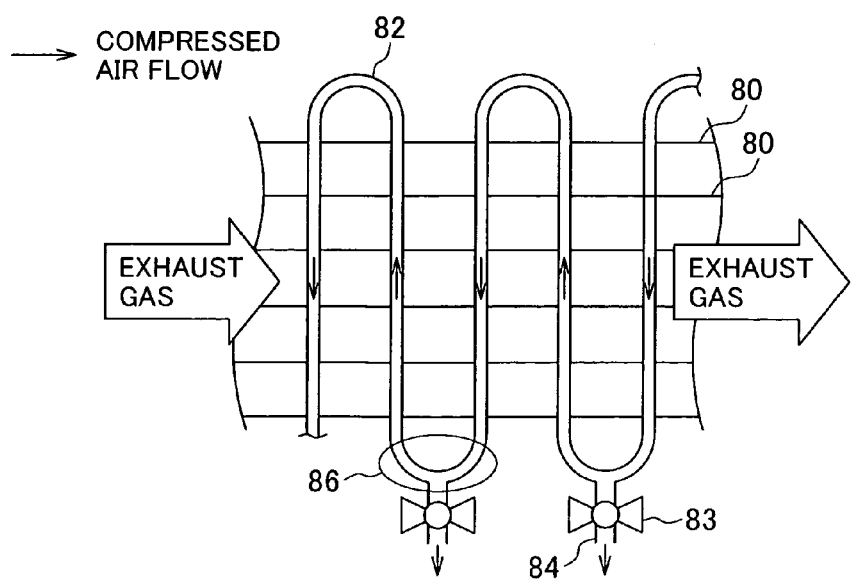
FIG. 3 is a structural diagram of a regenerative heat exchanger representing one embodiment of the present invention.

Now, an embodiment of the two phase type regenerative heat exchanger 36 as shown in FIGS. 1 and 2 will be explained with reference to FIG. 3. FIG. 3 shows a part of a fin and tube type heat exchanger. Heat of the high temperature air of the exhaust gas from the gas turbine 14 is taken out while passing through between plates 80. The low temperature side air of the compressed air supplied from the compressor 10 absorbs heat of the exhaust gas while flowing through a tube 82 which is coupled with the plates 80 in such a manner to pass therethrough. The moisture content in a liquid phase being collected due to gravity in U shaped tube portions 86 at the bottom of the tube 82 is discharged outside the tube 82 when valves 83 are opened because of pressure difference between the compressed air and external air.

In the U shaped tube portions 86 at the bottom of the tube 82 where the moisture content in liquid phase is likely collected, the moisture content evaporates more than in the other portions, therefore, a possibility of scale generation therein is high. Further, it is also possible that an already existing scale serves as a core which grows a further larger scale to cause tube clogging. Contrary, as in FIG. 3 embodiment, when a drain 84 serving as a drain tube is provided at a position where water is likely collected and the valve 83 is occasionally opened depending on collecting condition of the moisture content in liquid phase, the liquid collection causing scale generation is removed, and reduction of heat exchange efficiency, pressure loss increase and a possible clogging of the tubes can be suppressed.

Figure 4:
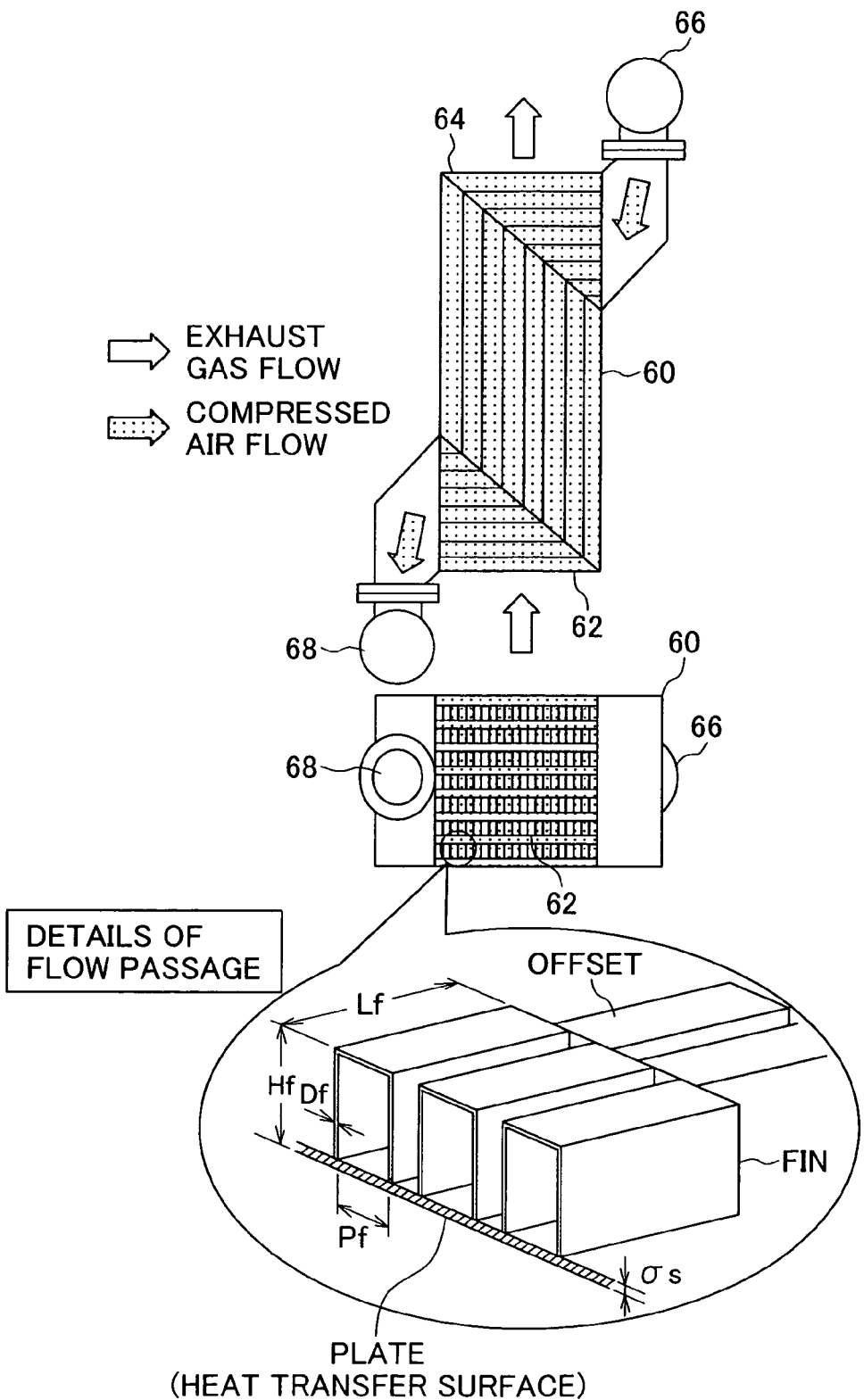
FIG. 4 is a diagram showing a regenerative heat exchanger having a unit module structure representing another embodiment of the present invention.
Figure 5:
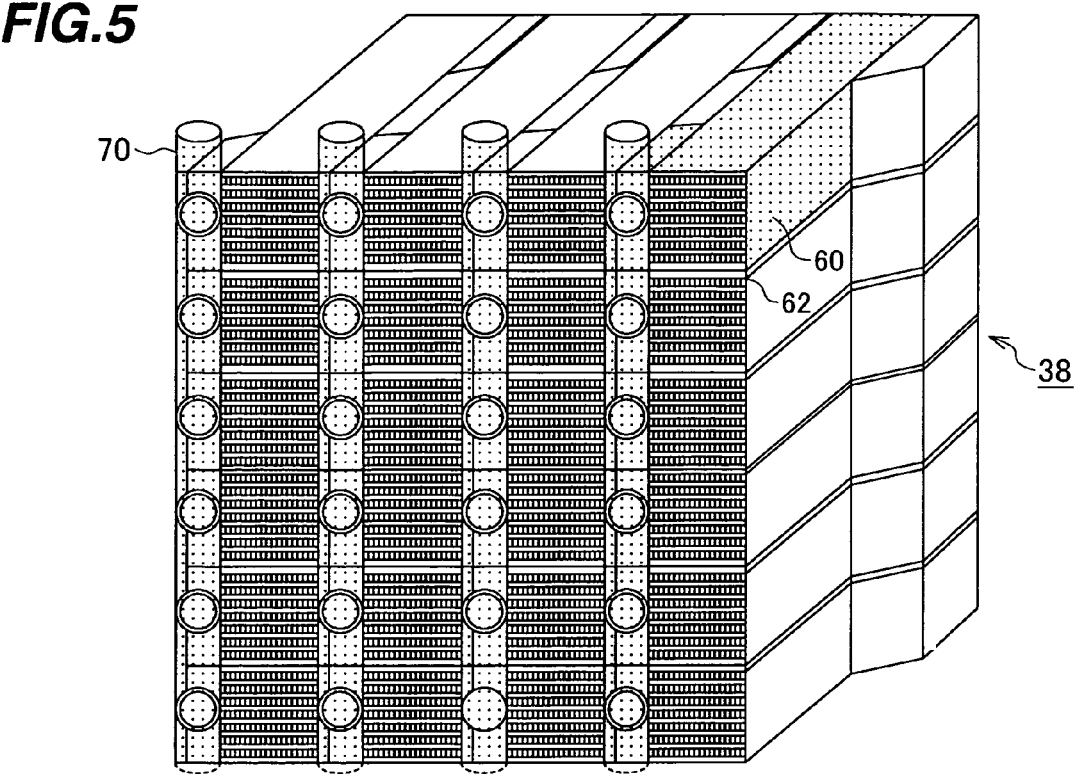
FIG. 5 is a diagram showing a regenerative heat exchanger constituted by combining a plurality of unit modules as shown in FIG. 4.

FIGS. 4 and 5 show an embodiment of the single phase type regenerative heat exchanger 38 having a specific structure. In the single phase type regenerative heat exchanger 38 as shown in FIGS. 4 and 5 a plate-fin type is used. FIG. 4 shows a unit module 60 in the single phase type regenerative heat exchanger 38, and FIG. 5 shows an entire single phase type regenerative heat exchanger 38 which is constituted by gathering 25 pieces of the unit modules 60 as shown in FIG. 4. The exhaust gas of the gas turbine flows in from an exhaust gas inlet port 62 and is discharged from an exhaust gas outlet port 64, while the heat thereof being taken off in the regenerative heat exchanger. On the other hand, the compressed air supplied from the compressor 10 flows in from a compressed air inlet port 66 and flows out from a compressed air outlet port 68, while taking off the heat from the exhaust gas. In order to save piping works for the pipings of the compressed air for the respective unit modules it is preferable to use collective pipes 70 connecting the compressed air inlet ports and outlet ports for the respective unit modules.

When the regenerative heat exchanger is constituted in the unit module structure as shown in FIG. 5, a proper regenerative heat exchanger meeting to a gas turbine having any output can be constituted only by changing number of unit modules. Thereby, the research and developing time for the regenerative heat exchanger is shortened and the designing cost thereof can be saved.

Figure 6:
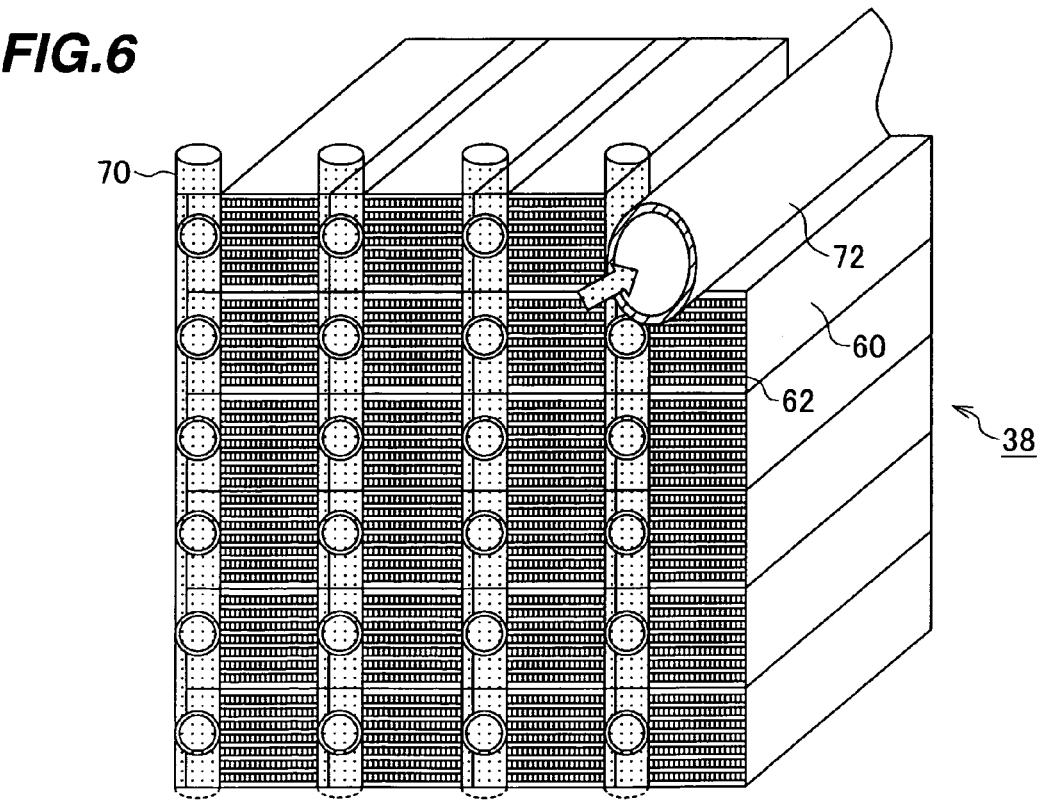
FIG. 6 is a diagram of a modification of FIG. 5 embodiment showing a regenerative heat exchanger structure and a piping layout.

FIG. 6 is a diagram showing a modification of FIG. 5 single phase type regenerative heat exchanger. A pipe in which air having a higher temperature than the atmospheric air but lower temperature than the exhaust gas is sometimes required to prevent heat radiation of the air therein and to prevent heat loss. Further, when the compressed air in the pipe contains water droplets, such pipe is sometimes required to heat the air therein and to accelerate evaporation of the water droplets. In such instances, when a part of the modules is removed and an air pipe 72 is laid in the space adjacent to the neighboring modules as shown in FIG. 6, the heat radiation form the regenerative heat exchanger prevents the heat loss of the compressed air through the pipe and sometimes heats the air therein. Through the moduling of the regenerative heat exchanger, flexibility of piping layout around the regenerative heat exchanger can be increased as well as since the radiating heat of the regenerative heat exchanger can be effectively utilized, the plant efficiency can be enhanced.

Further, in the pipe which supplies the compressed air from the compressor to the regenerative heat exchanger, if a porous material is filled, a mixing effect between the water droplets and air can be enhanced, thereby, many water droplets can be rapidly evaporated. With such measure, further much moisture content can be evaporated with a simple installation and the output and efficiency of the gas turbine can be increased with low cost.

According to the gas turbine installation of the present invention, generation of erosion and scales due to water droplets are suppressed, and a compact gas turbine installation with high efficiency and high output can be provided.

Details of a plate-fin type regenerative heat exchanger will be described below with reference to FIGS. 7 to 19. The above embodiment has been described as arranging the heat transfer surfaces each having a relatively large flow passage cross-sectional area in the region where the liquid (water) droplets are evaporated, and as optionally using a plate-fin type regenerative heat exchanger as practicable one of heat exchanger types. In the case of using the plate-fin type regenerative heat exchanger in that region, however, quantitative studies regarding an actual value of the fin pitch are required to avoid influences of the water droplets. If there generates a region where the liquid droplets are locally concentrated, bridging may occur between fin members and the flow passage may be clogged.

The following description is made of embodiments of the plate-fin type regenerative heat exchanger for heating compressed air containing a large amount of moisture, which can prevent clogging of the flow passage otherwise caused by a drift of liquid phase water.

Figure 8:
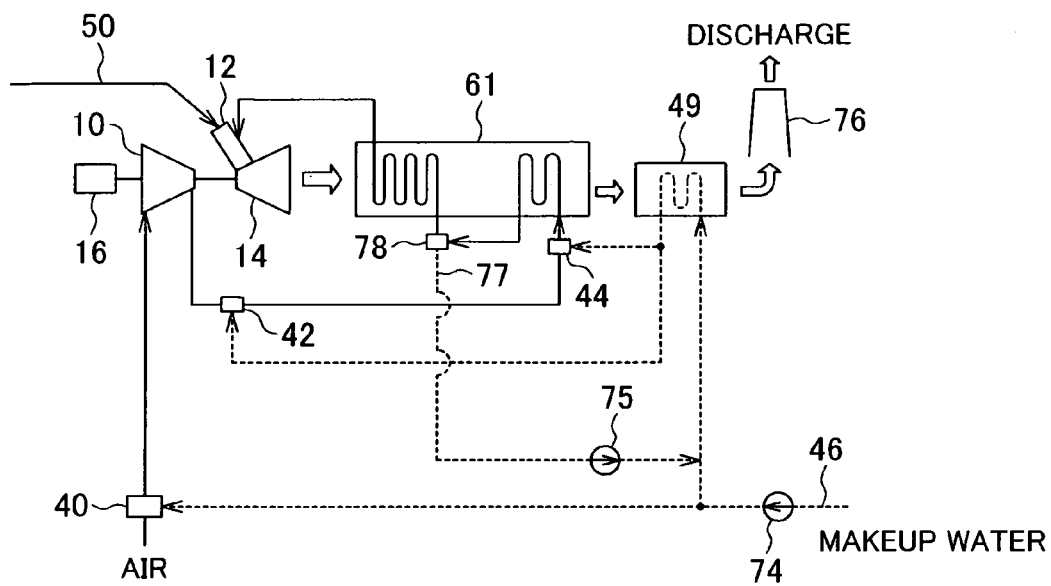
FIG. 8 is a system diagram of an advanced humid air turbine power system.

FIG. 8 shows an advanced humid air turbine power system equipped with the plate-fin type regenerative heat exchanger according to another embodiment of the present invention. Main components of this embodiment include a compressor 10 for compressing air and delivering compressed air; a combustor 12 for combusting the compressed air obtained by the compressor 10 and fuel to produce combustion gas; a turbine 14 driven by the combustion gas produced by the combustor 12; a plate-fin type regenerative heat exchanger 61 for heating all or a part of the compressed air supplied from the compressor 10 to the combustor 12 by utilizing heat of exhaust gas exhausted from the turbine 14; an economizer 49 for heating makeup water, described later, by utilizing heat of the exhaust gas exhausted from the plate-fin type regenerative heat exchanger 61; and a stack 76 for guiding the exhaust gas exhausted from the economizer 49 and discharging the exhaust gas through it. Motive power obtained from an output shaft of the gas turbine is converted into electric power by a generator 16 and is introduced to a power transmission system (not shown). Furthermore, a flow passage within the plate-fin type regenerative heat exchanger 61 on the compressed air side is partitioned into a corrugated fin channel 53 for heating the compressed air to which liquid droplets have been sprayed from a water spraying device 44, and a corrugated fin channel 54 for heating humid compressed air in a state where the sprayed liquid droplets have all evaporated.

Other main components of this embodiment include a water spraying device 40 for spraying small water droplets to intake air upstream of the compressor 10 for humidification of the intake air; a makeup water supply pipe 46 for introducing makeup water supplied from a pure water producing apparatus (not shown); a makeup water pump 74 for pressurizing the makeup water and delivering the pressurized makeup water to the water spraying device 40 and later-described water spraying devices 42, 44; the water spraying devices 42, 44 for receiving the makeup water supplied from the makeup water pump 74 after being heated by the economizer 49, and spraying the heated makeup water into piping for the compressed air through spray nozzles (not shown); the water spraying device 40 for receiving the makeup water supplied from the makeup water pump 74 and spraying the makeup water toward air supplied to the compressor 10 through a spray nozzle (not shown) for humidification of the air; a liquid droplet separator 78 disposed downstream of the corrugated fin channel 53 and capturing the liquid droplets having passed the corrugated fin channel 53 without evaporating therein; a drain pipe 77 disposed downstream of the corrugated fin channel 53 and discharging, to the exterior of the plate-fin type regenerative heat exchanger 61, the liquid droplets having passed the corrugated fin channel 53 without evaporating therein; and a circulation pump 75 for pressurizing drain water discharged through the drain pipe 77 and circulating the drain water again into a line for joining with the makeup water supplied from the makeup water pump 74.

The water spraying devices 40, 42 and 44 may be each an atomizer disclosed in, e.g., JP-A-2002-355583. According to the atomizer disclosed in that publication, an amount of air required for atomization can be cut down to a half of the amount required in the prior art, and sprayed liquid droplets have diameters of not larger than 16 mm, i.e., comparable to those in the prior art. Therefore, the sprayed liquid droplets are transported while being carried on air flows without colliding against inner surfaces of the piping and an intake duct, whereby evaporation of the liquid droplets is promoted. Incidentally, in that known art, air necessary for the atomization is extracted from the compressor 10, but such an arrangement is not shown in the drawing representing this embodiment because a flow rate of the extracted air is small.

The water spraying device 42 disposed in the piping for the compressed air is located upstream of the water spraying device 44 and is installed in such a position as ensuring a time required for the liquid droplets sprayed into the piping to take off latent heat necessary for evaporation from the high-temperature compressed air and to evaporate. In this embodiment, the distance between the water spraying devices 42 and 44 was set to about 3 meters. This value of the distance was derived through evaporation behavior calculations of liquid droplets by employing, as input parameters, conditions such as the flow speed within the piping and the temperature of the compressed air.

Figure 7A:
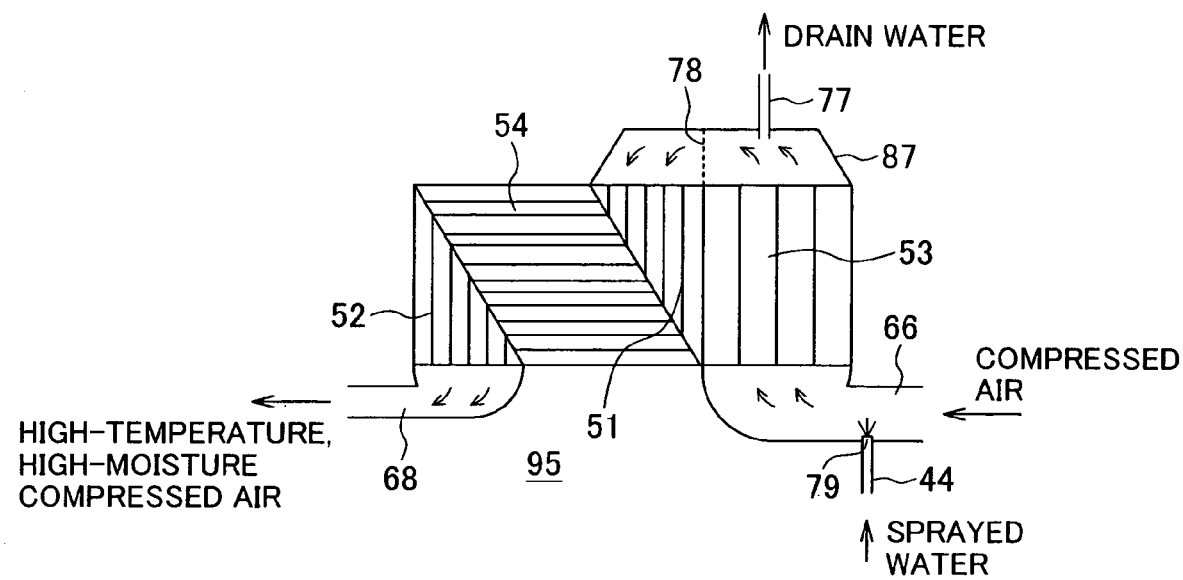
FIGS. 7A and 7B are horizontal sectional views of a plate-fin type regenerative heat exchanger according to another embodiment of the present invention.
Figure 7B:
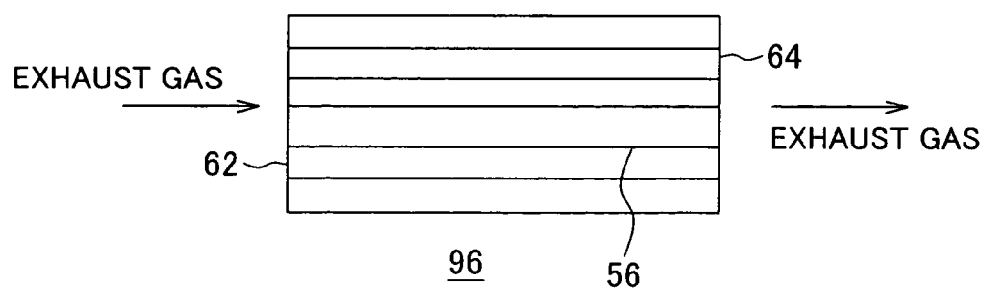
Figure 10A:
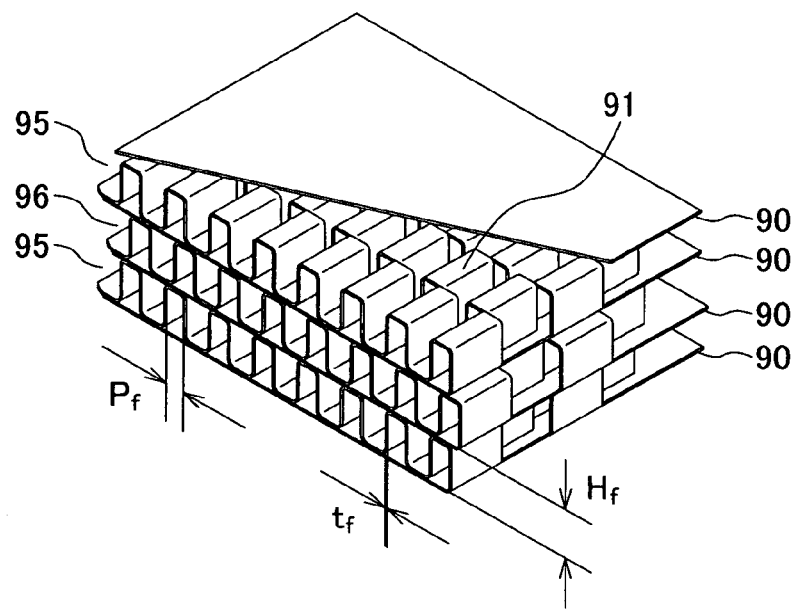
FIGS. 10A, 10B and 10C are schematic perspective views of different fin structures of the plate-fin type regenerative heat exchanger.
Figure 17:
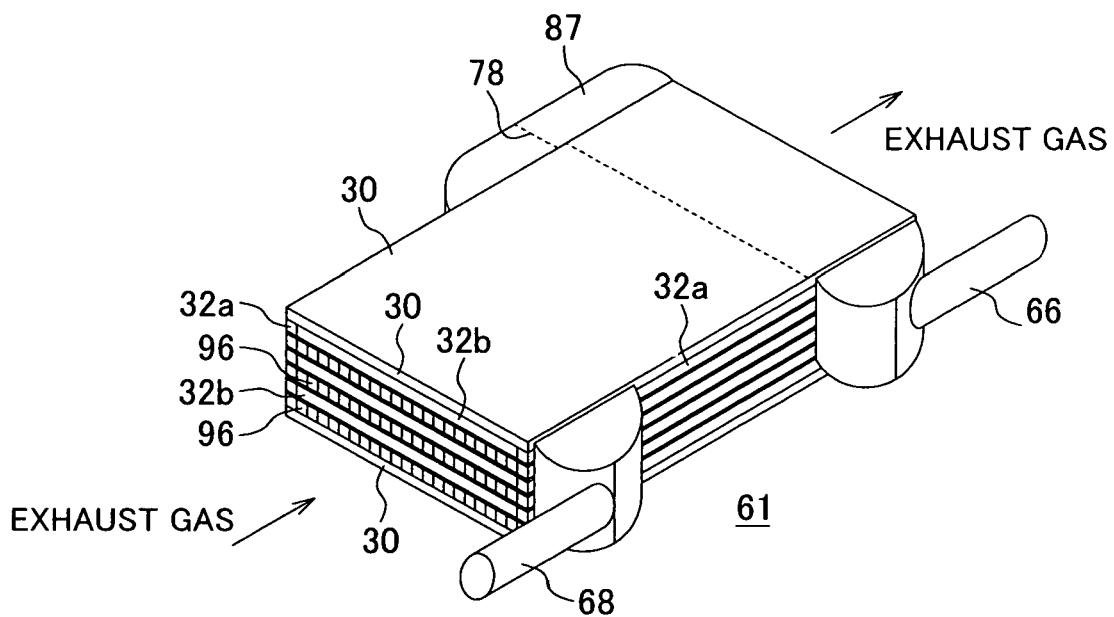
FIG. 17 is a perspective view of the plate-fin type regenerative heat exchanger.

FIGS. 7A and 7B are horizontal sectional views of the flow arrangement of the plate-fin type regenerative heat exchanger 61. More specifically, FIG. 7A shows a heated fluid flow passage 95 serving as a flow passage of the compressed air, and FIG. 7B shows a heating fluid flow passage 96 serving as a flow passage of the exhaust gas. The so-called plate-fin type heat exchanger is, as shown in FIG. 10A, of a structure comprising the heating fluid flow passage 96 and the heated fluid flow passage 95 alternately stacked one above the other with a tube plate 90 placed between them for partition. As seen from a perspective view of the plate-fin type regenerative heat exchanger 61 shown in FIG. 17, members generally called spacer bars 32 are mounted to corresponding ends of the heating fluid flow passage 96 and the heated fluid flow passage 95 alternately stacked one above the other for partition of the flow passages of fluids subjected to heat exchange. For example, as shown in FIG. 17, the lower left end (as viewed on the drawing sheet) of each step of the heating fluid flow passage 96 into which the exhaust gas flows is left open, while a spacer bar 32b is disposed at the lower left end of each step of the heated fluid flow passage 95 to prevent the exhaust gas from mixing into the heated fluid flow passage 95. Also, as shown in FIG. 17, side plates 30 are mounted to upper and lower surfaces of a heat exchanger core. The side plates 30 have the functions of maintaining the shape of the heat exchanger core and isolating the fluids subjected to heat exchange from the exterior. Note that, although the water spraying device 44 is not shown in FIG. 17, it is attached to a pipe constituting a compressed air inlet port 66.

Figure 10B:
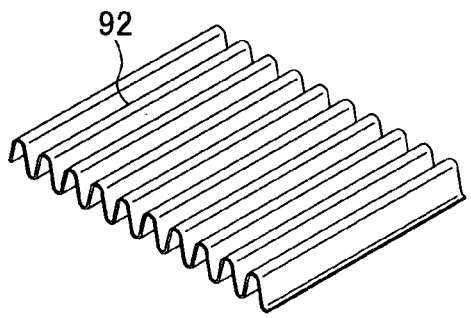
Figure 10C:
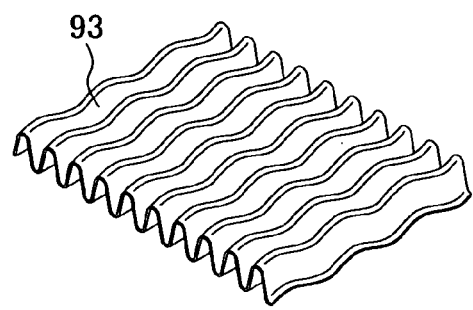

In each of the heating fluid flow passage 96 and the heated fluid flow passage 95 shown in FIG. 7, one of a serrated fin 91 shown in FIG. 10A, a plain fin 92 shown in FIG. 10B, a herring bone fin 93 shown in FIG. 10C, etc. is installed for the purposes of increasing the heat transfer surface area and agitating the flow to promote heat transfer. Respective shapes of those fins have specific features in pressure loss and performance for promoting heat transfer, and suitable one of those fin shapes is selectively employed depending upon the use. In this embodiment, the serrated fin 91 shown in FIG. 10A is employed in each of a corrugated fin channel 56 serving as the flow passage of the exhaust gas and the corrugated fin channel 54 serving as a part of the flow passage of the compressed air, whereas the plain fin 92 shown in FIG. 10B is employed in each of the corrugated fin channel 53 and distribution fin channels 51, 52.

The reasons why the fin type is selected as described above are as follows. Because the liquid droplets flow into the corrugated fin channel 53, the plain fin 92 capable of easily cleaning the heat transfer surfaces therein is selected for the corrugated fin channel 53, taking into account generation of scales attributable to evaporation of the liquid droplets. Also, even when the liquid droplets are locally concentrated in a certain area due to uneven distribution of the liquid droplets, it is possible to prevent bridging of the liquid droplets and hence to prevent clogging of the flow passage with the fin pitch set to a relatively large value. If the serrated fin 91 is employed in the corrugated fin channel 53, bridging of the liquid droplets is apt to generate because fin members are arranged at a ½-pitch shift between them and hence a minimum passage area is ½ of the fin pitch. The reason why the distribution fin channels 51 and 52 are each constituted using the plain fin 92 resides in that a smaller pressure loss is advantageous from the viewpoint of distribution function, i.e., the specific purpose of those channels. Because of the distribution fin channel having a triangular shape, a deflection generates in the distribution fin channel if the difference in pressure loss between a flow passage area having a short distance and a flow passage area having a long distance increases. For the other heat transfer surface areas than described above, the serrated fin 91 is selected for the reasons that it has superior heat transfer characteristics and is easily available.

The structure of the plate-fin type regenerative heat exchanger 61 will be described in more detail with reference to FIG. 7. The water spraying device 44 is attached to the pipe constituting the compressed air inlet port 66 such that small liquid droplets can be sprayed into the pipe through a spray nozzle 79 mounted to a fore end of the water spraying device 44. The compressed air to which the small liquid droplets have been sprayed is introduced to the corrugated fin channel 53 that is a first heat exchange section. The corrugated fin channel 53 is constituted using the plain fin 92, shown in FIG. 10B, for the reasons described above. In FIG. 10, the fin pitch denoted by Pf is set to 3 mm, the fin height denoted by Hf is set to 4 mm, and the fin thickness denoted by tf is set to 0.4 mm. The reason why the fin pitch is set to 3 mm is to prevent bridging of the liquid droplets even when the liquid droplets are locally concentrated in a certain area due to uneven flow distribution of the liquid droplets. A capillary length expressed by the following formula (1) was employed as an index for preventing the bridging of the liquid droplets. The capillary length is also called the Laplace length and corresponds to a flow passage width at which a liquid phase flow becomes dominant due to surface tension in a narrow pipe having an air-liquid interface.

$$L = \left(\frac{\sigma}{g \Delta \rho}\right)^{\frac{1}{2}} \quad (1)$$

In the above formula (1), s represents the surface tension, g represents the acceleration of gravity, and Dr represents the density difference between air and liquid. In this embodiment, the liquid droplets at about 150° C. are sprayed in the corrugated fin channel 53, but the sprayed liquid droplets are deprived of latent heat for evaporation. Therefore, the sprayed liquid droplets finally collide against the fin member and transform into liquid films while approaching a stationary temperature called a liquid droplet equilibrium temperature. Under the conditions of this embodiment, the liquid droplet equilibrium temperature is approximately 100° C. By putting, in the above formula (1), the surface tension s of water in contact with air and the density difference Dr between air and liquid under those conditions, the capillary length Lp of about 2.5 mm is obtained. Therefore, the fin pitch Pf required for preventing the bridging of the liquid droplets between the fin members was set to 3 mm by adding the fin thickness to the capillary length.

A lower limit of the fin height is determined from the condition not causing the bridging of the liquid droplets. There is, however, a tendency that a larger fin height increases an equivalent diameter of the flow passage and reduces the heat transfer performance. In this embodiment, therefore, the fin height was set to 4 mm. Usually, a lower limit of the fin thickness is determined from the total pressure of the fluid acting on the tube plate surface, and an upper limit of the fin thickness is determined from economy depending upon an increase in the amount of materials used and the performance of a machining tool for shaping the fin. In this embodiment, the fin thickness was set to 0.4 mm, i.e., nearly an upper limit value of the thickness of a generally available material, taking into account erosion of the fin material caused by the liquid droplets.

The corrugated fin channel 53 has an arrangement feature that the flow passage of the compressed air is formed linearly without including curved portions from a macroscopic point of view. If the corrugated fin channel 53 is arranged so as to change the flow direction at a right angle therein by using the distribution fin channels 51 and 52 which are installed in the corrugated fin channel 54 described later, there is a possibility that, because gaseous molecules and liquid droplets have momentums different from each other, the liquid droplets entrained with the air flow collide against the fin members located in a front position at a corner and liquid films are formed at the corner in a concentrated way. The formation of those liquid films may impede uniform evaporation over the entire heat exchanger and may disable generation of the required amount of heat to be exchanged. For those reasons, the corrugated fin channel 53 is installed in an orthogonal flow arrangement in which the corrugated fin channel 53 extends perpendicularly to the exhaust gas flow.

Downstream of the corrugated fin channel 53, a header 87 is disposed to collect compressed air flows in respective steps of plate fins together. Below the header 87, a drain pipe 77 is installed to drain the liquid droplets and the liquid films which have not been completely evaporated in the corrugated fin channel 53. Further, the header 87 is provided with the liquid droplet separator 78 for separating and capturing small liquid droplets flowing while being carried on the compressed air. The liquid droplets captured by the liquid droplet separator 78 are introduced to the drain pipe 77 by gravity. As shown in FIG. 17, the header 87 has a flattened semi-cylindrical shape including an outlet of the corrugated fin channel 53 and an inlet of the distribution fin channel 51. Further, the liquid droplet separator 78 is assembled at a center of the header 87 in advance.

Downstream of the liquid droplet separator 78, there is a second heat exchange section for heating the humid compressed air containing no liquid phase water. In this second heat exchange section, the distribution fin channel 51, the corrugated fin channel 54, and the distribution fin channel 52 are arranged successively in this order. In FIG. 7, by way of example, the second heat exchange section has a Z-shaped fin channel arrangement constituted by the distribution fin channel 51, the corrugated fin channel 54, and the distribution fin channel 52. The plane fin 92 having a small pressure loss is employed as each of the distribution fin channels 51 and 52 as described above. For the same reason, the fin pitch of the distribution fin channels 51 and 52 is preferably as large as possible. In this embodiment, the fin pitch was set to 4 mm, taking into account the function of bearing the pressure acting on the tube plate 90. On the other hand, the corrugated fin channel 54 serves as a primary part for heating the humid compressed air containing no liquid phase water, and the total amount of heat exchanged in the corrugated fin channel 54 is several or more times larger than that in the corrugated fin channel 53 for heating the humid compressed air containing the liquid phase water. The corrugated fin channel 54 is therefore required to have superior heat transfer performance. In addition to using, as the fin type, the serrated fin 91 having superior heat transfer performance as described above, the fin pitch must be set to a smaller value to ensure a larger heat transfer surface area. For those reasons, in this embodiment, the fin pitch was selected to 2 mm and the fin thickness was selected to 0.3 mm. The fin height of the corrugated fin channel 54 is the same as that of the corrugated fin channel 53 so that both the channels are installed between the common tube plate surfaces.

Figure 9:
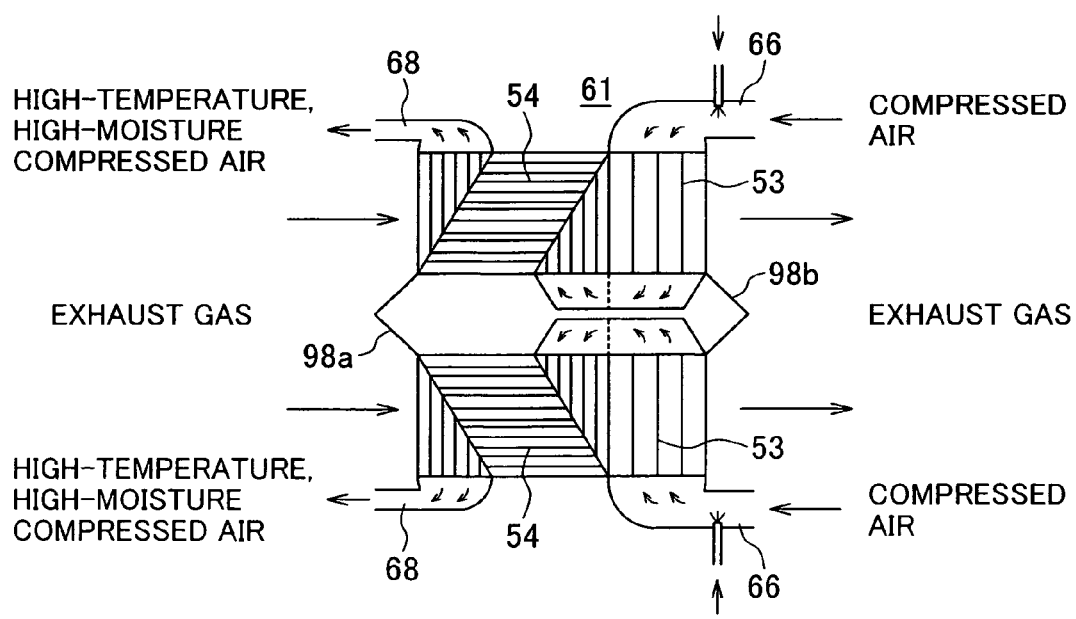
FIG. 9 is a horizontal sectional view of the plate-fin type regenerative heat exchanger in a combined state.

Thus, corresponding to different phase states of water in the corrugated fin channels 53 and 54, the fin pitch of the corrugated fin channel 53 was set larger than that of the corrugated fin channel 54. In practice, when the plate-fin type regenerative heat exchanger 61 is installed in the system shown in FIG. 8, a required number of heat exchanger modules are arranged side by side as shown in FIG. 9. FIG. 9 shows an example in which two plate-fin type regenerative heat exchangers 61 are arranged in a bilaterally symmetrical relation. The number of steps of the plate fins stacked in the vertical direction is decided depending upon the required amount of heat to be exchanged. Since the number of steps stackable in a single block depends upon the specifications of a production facility, a plurality of heat exchanger modules are arranged side by side to lie in the vertical direction when the required number of steps is not obtained in one block.

The operation of the advanced humid air turbine power system equipped with the plate-fin type regenerative heat exchanger of this embodiment will be described below with reference to FIGS. 7 to 10.

Air taken into an intake chamber (not shown) is forced to pass through an intake filter (not shown) for removal of soot and dust. Then, small liquid droplets are sprayed from the water spraying device 40 at a mass flow rate equal to about 1% of that of the air. The liquid droplets at such a mass flow rate are substantially all evaporated in a space within the intake chamber prior to entering the compressor 10 while taking off latent heat for evaporation from the intake air and lowering the temperature of the intake air. Even if the liquid droplets are not perfectly evaporated because of improper atmosphere condition and spray condition, the remaining liquid droplets are all evaporated within the compressor as the air temperature in the compressor rises. Thus, since the temperature of the air to be compressed is lowered by spraying water to the intake air from the water spraying device 40, the compressor power can be reduced and the gas turbine output can be increased correspondingly.

Subsequently, the air compressed by the compressor 10 is subjected to spray of small liquid droplets again from the water spraying device 42. Water sprayed from the water spraying device 42 and the later-described water spraying device 44 is heated to high temperatures of not lower than 150° C. by heat of the exhaust gas in the economizer 49 for the purpose of reducing the amount of heat taken off upon evaporation and increasing thermal efficiency of the system. Since the piping downstream of the water spraying device 42 has, as described above, a length required for the liquid droplets sprayed into the piping to evaporate, the sprayed liquid droplets are all evaporated midway the piping. Therefore, the compressed air heated to high temperatures of about 300° C. in the compressor 10 is cooled down to about 150° C. while the moisture content approaches 10% of the air mass flow rate. Further, prior to reaching the corrugated fin channel 53 of the plate-fin type regenerative heat exchanger 61, the compressed air is subjected to third spray of small liquid droplets from the water spraying device 44. As a result of the third spray, the total moisture content takes a value exceeding 10% of the air mass flow rate. In the third spray, because the liquid droplets are sprayed at a moisture content exceeding the saturated steam pressure at the temperature in the spray position, the sprayed liquid droplets are not all evaporated and a part of them enters the corrugated fin channel 53 in the state of liquid droplets.

In this embodiment, since the plain fin 92 is employed as the fin type of the corrugated fin channel 53, the small liquid droplets flow while being carried on the air flow without colliding against fin wall surfaces. During that process, the compressed air is heated through forced convection heat transfer with respect to the heat transfer surfaces, and the saturated steam pressure increases correspondingly. As a result, the liquid droplets flowing while being carried on the air flow are gradually evaporated, and at the time of reaching the header 87, almost all of the liquid droplets are evaporated. The liquid droplets having not evaporated in the corrugated fin channel 53 and the liquid films generated upon the liquid droplets collide against an inner wall surface of the header 87 and drop from there by gravity, followed by being discharged through the drain pipe 77 disposed below the header 87 and then heated again by the economizer 49 via the circulation pump 75. Also, though not shown, drain water generated downstream of the water spraying devices 42, 44 is supplied again to the economizer 49 for reuse through respective pipes similar to the drain pipe 77.

The small liquid droplets tending to advance toward the downstream side while being carried on the air flow may still remain in the compressed air inside the header 87. Therefore, after separating and removing those small liquid droplets by the liquid droplet separator 78, only the humid compressed air in the gaseous phase is supplied to the distribution fin channel 51. The humid compressed air having passed the distribution fin channel 51 having the triangular form is subjected to heat exchange with the high-temperature exhaust gas in the corrugated fin channel 54 having the small fin pitch and the large heat transfer surface area. After being heated up to about 600° C., the humid compressed air changes its direction while flowing into the distribution fin channel 52 and is taken out through a compressed air outlet port 68 formed at the side. The reason why a large amount of moisture is added to the compressed air from the water spraying devices 42 and 44 is to increase the mass flow rate and the heat capacity of the working medium carrying out work in the turbine 14 and to produce a higher turbine output. An upper limit in amount of the moisture to be added is determined depending upon the amount of heat recoverable from the exhaust gas. If moisture is added too much, the temperature of the humid air after being heated by the plate-fin type regenerative heat exchanger would be relatively low and the amount of fuel to be loaded into the combustor 12 would be increased, thus resulting in no increase of the system efficiency. Taking into account such a result of the study, this embodiment is arranged to add about 12% of moisture in total with respect to the air mass flow rate.

The reason why the compressed air is humidified in two divided positions using the water spraying devices 42 and 44 is as follows. If a large amount of liquid droplets are sprayed in one position without dividing the spray position, there would be a possibility that, depending upon the mixed condition of the liquid droplets and air, the mixture is separated into a low-temperature, high-moisture portion and a high-temperature, low-moisture portion. In such a case, the temperature difference between the compressed air serving as a heated fluid and the exhaust gas serving as a heating fluid is reduced in the plate-fin type regenerative heat exchanger 61, and the intended heat exchange action cannot be developed. In this embodiment, therefore, the compressed air flow is first entirely brought into a low-temperature, high-moisture state with humidification using the water spraying device 42. Then, the compressed air is humidified by the water spraying device 44 to surely produce low-temperature, high-moisture air containing the liquid droplets, thereby ensuring satisfactory heat exchange within the plate-fin type regenerative heat exchanger 61.

The humid compressed air taken out from the compressed air outlet port 68 of the plate-fin type regenerative heat exchanger 61 is supplied to the combustor 12 and combusted therein together with fuel 50 to produce combustion gas at high temperatures exceeding 1100° C. Because the compressed air is heated by the plate-fin type regenerative heat exchanger 61, the flow rate of the fuel 50 required in the above process can be much reduced in comparison with the case of not employing the regenerative heat exchanger, thus resulting in higher thermal efficiency of the plant. The high-temperature combustion gas is supplied to the turbine 14 to pass a nozzle and a bucket (not shown) so that thermal energy is converted into rotation kinetic energy through the expansion process of Brayton cycle. The rotation kinetic energy drives the generator 16 coupled to the same shaft as the turbine 14 and is taken out as electric energy. Combustion exhaust gas exhausted from the turbine 14 after the expansion process is at high temperatures of not lower than 650° C. and is supplied to the flow passage of the exhaust gas from the plate-fin type regenerative heat exchanger 61 to be utilized for heating the humid compressed air. Further, the exhaust gas exhausted from the plate-fin type regenerative heat exchanger 61 is at high temperatures of not lower than 200° C. and is supplied to the economizer 49 to be utilized for heating the makeup water. The exhaust gas exhausted from the economizer 49 is introduced to the stack 76 and discharged into the atmosphere.

Thus, by injecting a proper amount of moisture to the regenerative cycle gas turbine at a proper position in a proper manner, exhaust heat can be utilized with a smaller loss in the overall system, thus resulting in a higher thermal output and higher thermal efficiency. Although there has been a problem in a method for realizing the regenerative heat exchanger accompanying with evaporation of liquid phase water, it is possible to realize a regenerative heat exchanger, which is as compact as possible, can suppress an increase of pressure loss and clogging due to a drift of the liquid phase water, can reduce an influence of scales generated with evaporation of the liquid phase water, can provide means for draining the liquid phase water having passed the heat exchanger without evaporating, and can retard corrosion of the heat transfer surfaces, by employing the plate-fin type regenerative heat exchanger and arranging the heat transfer surface region in two sections partitioned depending upon the presence or absence of the liquid phase water.

Figure 18:
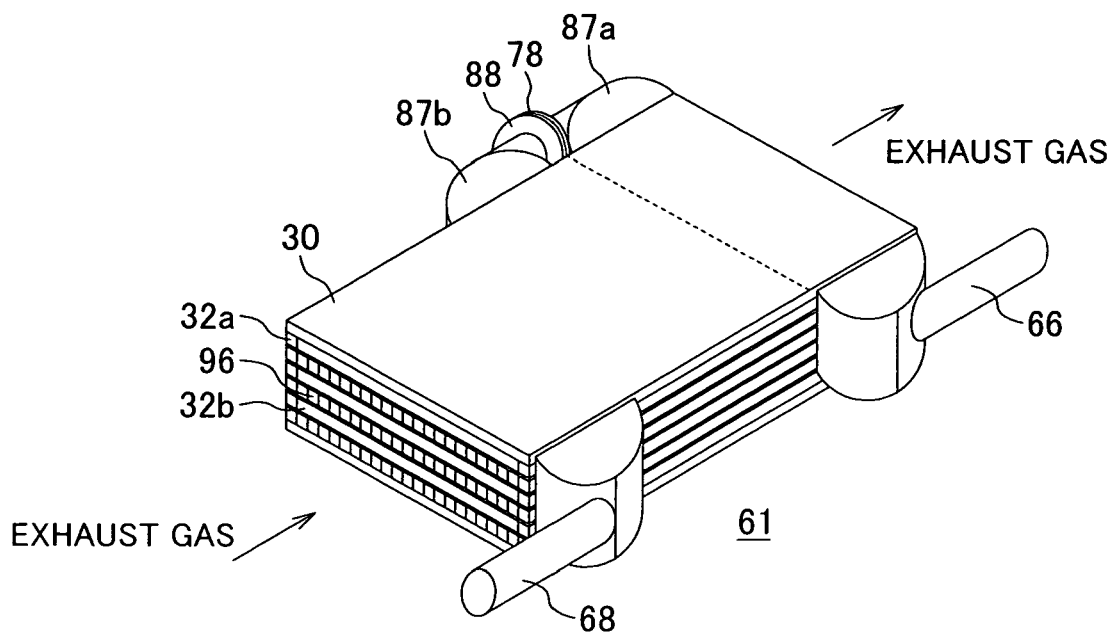
FIG. 18 is a perspective view of the plate-fin type regenerative heat exchanger.
Figure 19:
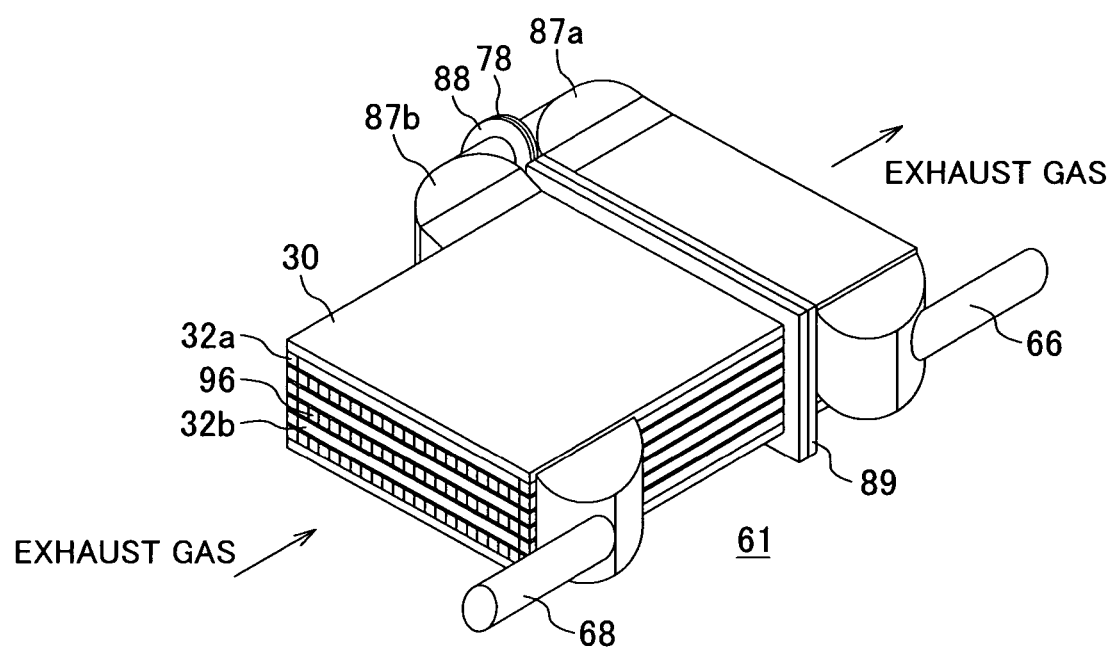
FIG. 19 is a perspective view of the plate-fin type regenerative heat exchanger.

While the header 87 in this embodiment is of an integral structure having a flattened semi-cylindrical shape as shown in FIG. 17, the header structure may be modified as follows. As shown in FIG. 18, for example, separate headers 87a, 87b are disposed respectively at the outlet of the corrugated fin channel 53 and the inlet of the distribution fin channel 51 and are connected to each other through a pipe. In such a case, the liquid droplet separator 78 can be detachably attached to the pipe through a flange 88 disposed midway the pipe. This structure is advantageous in maintenance of the components. From the viewpoint of thermal efficiency of the system, however, the integral flattened semi-cylindrical structure shown in FIG. 17 is more advantageous for the reason that, when the separate headers 87a, 87b are connected to each other through the pipe as shown in FIG. 18, there is a tendency that the fluid pressure loss increases depending upon the pipe diameter.

Figure 11A:
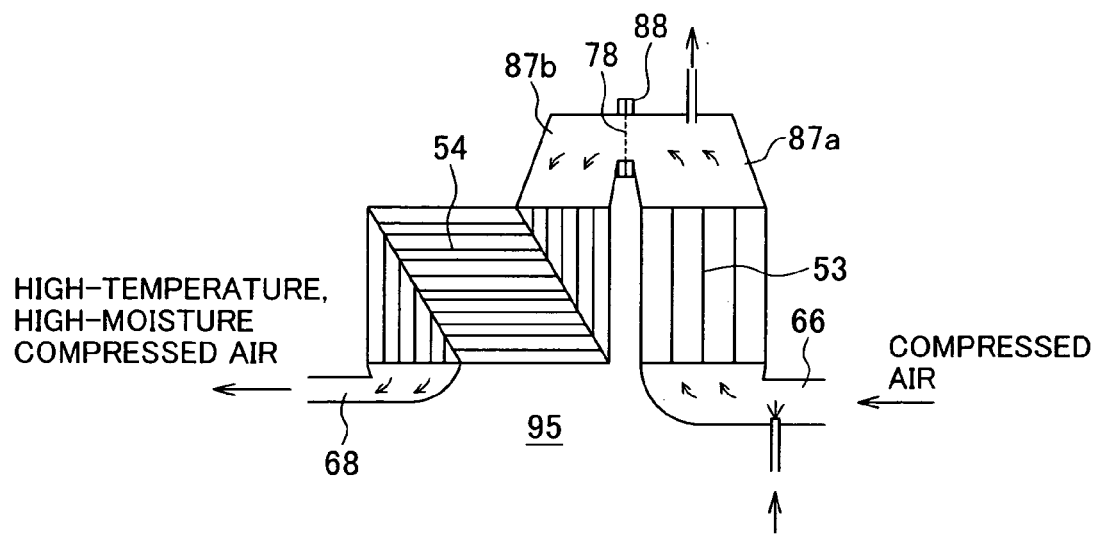
FIGS. 11A and 11B are horizontal sectional views of a plate-fin type regenerative heat exchanger according to a modification.
Figure 11B:
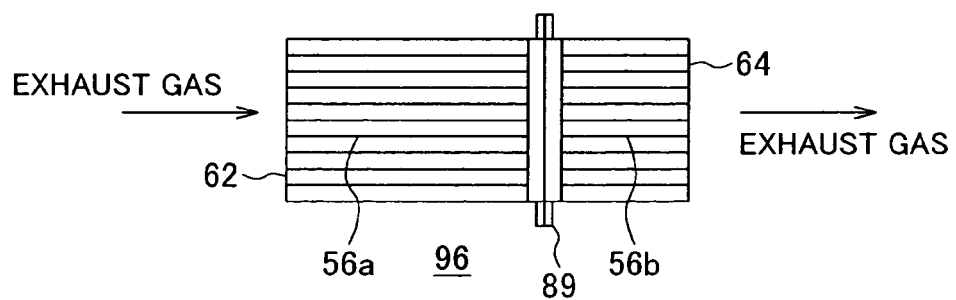

Further, while the plate-fin type regenerative heat exchanger 61 employed in this embodiment has the structure shown in FIG. 7, the corrugated fin channels 53, 54 may be constructed in a split structure and correspondingly the corrugated fin channel 56 may be constructed in a structure dividable into a pair of corrugated fin channels 56a and 56b, as shown in FIG. 11. In such a case, as shown in a perspective view of FIG. 19, a flange 89 is mounted to surfaces of the side plates 30 and the spacer bars 32, which constitute the sides of the heat exchanger core, so that the entire core is dividable at the boundary between the corrugated fin channels 53 and 54. By fastening the flange 89 with not-shown bolts and nuts, it is possible to easily integrate or divide the heat exchanger core constituted by the corrugated fin channels 53 and 54 as required. Compressed air channels serving as the heater fluid flow passage are also coupled to each other through a flange 88, shown in FIG. 19, so that those compressed air channels are similarly detachable from each other with ease. The other structure and operation are the same as those described above with reference to FIG. 7.

The split structure shown in FIG. 11 is advantageous in that, should the corrugated fin channel 53 is damaged by erosion, etc., the heat exchanger can be relatively easily replaced with a new one and the maintenance cost can be cut. On other hand, the necessity of providing the flanges 88, 89 results in an increases of the equipment cost and leads to a potentiality that the working fluid may leak through the flanges.

Figure 12A:
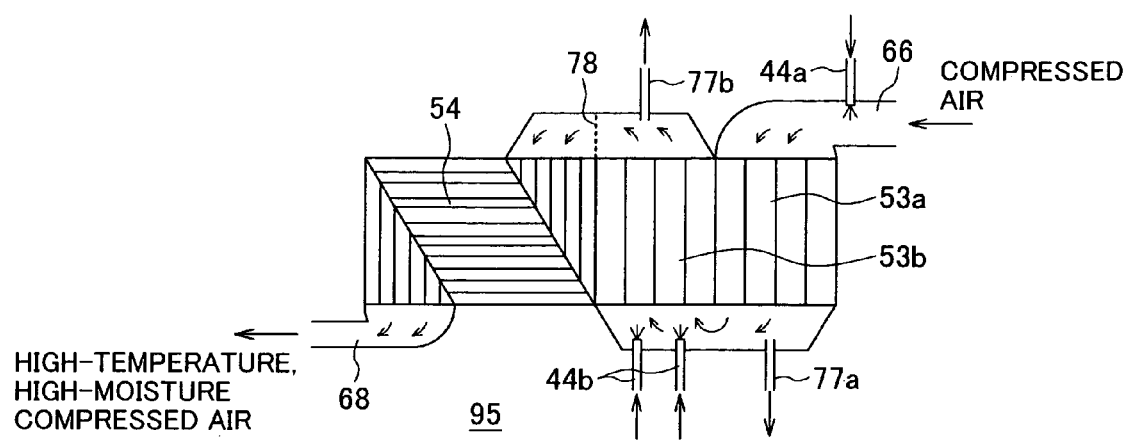
FIGS. 12A and 12B are horizontal sectional views of a plate-fin type regenerative heat exchanger according to another modification.
Figure 12B:
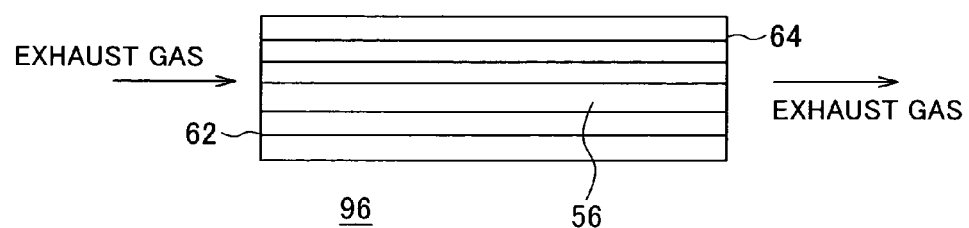

Moreover, while this embodiment has been described as providing the corrugated fin channel 53 in an only one-pass arrangement, the corrugated fin channel 53 may be constructed in a two-pass arrangement as shown in FIG. 12. Referring to FIG. 12, corrugated fin channels 53a, 53b are coupled to each other in series in this order from the upstream side, and water spraying devices 44a, 44b are disposed respectively upstream of the corrugated fin channels 53a, 53b. Also, drain pipes 77a, 77b are disposed respectively downstream of the corrugated fin channels 53a, 53b. The other structure is the same as that described above with reference to FIG. 7.

In the embodiment described above with reference to FIG. 7, the corrugated fin channel 53 is installed, as described above, to perform heat exchange of the compressed air with respect to the exhaust gas through the orthogonal flow arrangement for the purpose of constructing the corrugated fin channel 53 in the linear form, and hence temperature efficiency is lower than that in counterflow heat exchange in which fluids for the heat exchange flow in opposite directions. In a modification shown in FIG. 12, therefore, the corrugated fin channel 53 is constructed in the two-pass arrangement comprising the corrugated fin channels 53a and 53b so that the amount of heat required for evaporation of liquid phase water can be easily obtained.

With the construction shown in FIG. 12, humidification is also carried out in two stages using two water spraying devices. More specifically, because second humidification is carried out after heating the compressed air in the corrugated fin channel 53a on the upstream side, the saturated steam pressure is increased and hence a larger amount of moisture can be added. Also, because moisture is added a little by a little in a stepwise way, distributions of humidity and temperature tend to become more uniform and hence drain water can be prevented from generating in excessive amount. While the corrugated fin channel 53 shown in FIG. 12 is constructed in the two-pass arrangement, it is needless to say that a larger amount of moisture can be stably added by increasing the number of passes. However, the provision of the increased number of passes increases the overall size of the heat exchanger, requires a plurality of humidifiers, drain pipes, etc., and hence pushes up the equipment cost.

Another advanced humid air turbine power system equipped with a plate-fin type regenerative heat exchanger according to still another embodiment of the present invention will be described below with reference to FIG. 13.

The plate-fin type regenerative heat exchanger of this embodiment differs from that of the embodiment described above with reference to FIGS. 7 to 12 in that the drain pipe 77 for draining the liquid droplets is not provided and heat exchange is performed between the compressed air and the exhaust gas in the counterflow arrangement instead of the orthogonal flow arrangement.

Figure 13A:
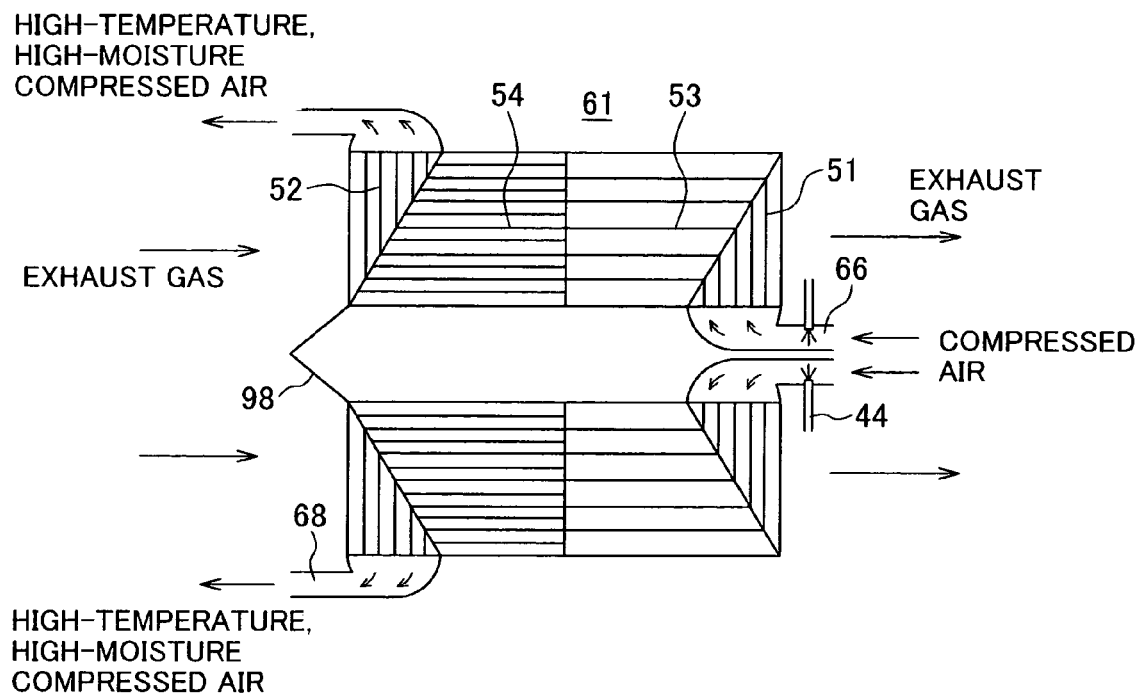
FIGS. 13A and 13B are horizontal sectional views of a plate-fin type regenerative heat exchanger according to still another embodiment, the former view showing a combined state.
Figure 13B:
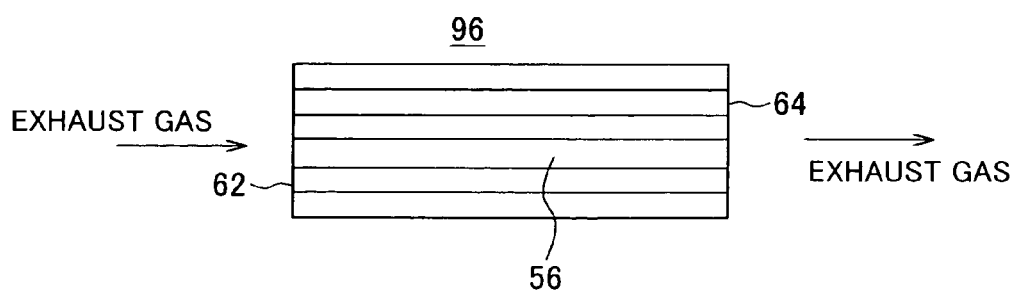

FIG. 13A is a horizontal sectional view showing the case in which two blocks of plate-fin type regenerative heat exchangers 61 are combined in a bilaterally symmetrical structure, and showing a channel arrangement of heated fluid flow passages 95. FIG. 13B is a horizontal sectional view showing a channel arrangement of one unit of a heating fluid flow passage 96. As in the above-described embodiment, the heated fluid flow passage 95 and the heating fluid flow passage 96 are alternately stacked in the vertical direction with the tube plate placed between them for partition.

A water spraying device 44 is attached to a pipe constituting a compressed air inlet port 66. Four fin channels, i.e., a distribution fin channel 51, a corrugated fin channel 53, a corrugated fin channel 54, and a distribution fin channel 52, are arranged successively in this order. The compressed air is finally introduced to a compressed air outlet port 68. The heating fluid flow passage 96 serving as the flow passage of the exhaust gas extends from an exhaust gas inlet port 62 to an exhaust gas outlet port 64 through a corrugated fin channel 56 extending in the linear form from a macroscopic point of view. Specifications of those fin channels are listed in Table 1 given below.

TABLE 1

|  | Flow passage (Channel) | | |
| --- | --- | --- | --- |
|  | Compressed air flow passage | | Exhaust gas flow passage |
|  | Channel 53 | Channel 54 |  |
| Fin type |  | Serrated fin |  |
| Channel length (m) | 0.464 | 0.928 | 1.392 |
| Fin pitch Pf (mm) | 5 | 2 | 4 |
| Fin height Hf (mm) | 3 | 3 | 6 |
| Fin thickness $t_f$ (mm) | 0.3 | 0.2 | 0.2 |
| Tube plate thickness (mm) |  | 1 |  |
| Material |  | Austenitic stainless steel |  |

In this embodiment, the serrated fin 91 shown in FIG. 10A is employed in each of the corrugated fin channels 53, 54 for the compressed air and the corrugated fin channel 56 for the exhaust gas, whereas the plain fin 92 shown in FIG. 10B is employed in each of the distribution fin channels 51 and 52.

The reasons why the fin type is thus selected are as follows. In this embodiment, since the drain pipe 77 is not disposed downstream of the corrugated fin channel 53, the liquid droplets are required to perfectly evaporate in the corrugated fin channel 53. If the plain fin 92 is selected as the fin type of the corrugated fin channel 53, there would be a possibility that, because the liquid droplets flow straightforward while being carried on the air flow, they pass through the corrugated fin channel 53 without evaporating depending upon spray conditions of the liquid droplets. By employing the serrated fin 91 in which ridges are successively arranged at an alternate shift of a half-pitch as shown in FIG. 10A, or the herring bone fin 93 in which ridges extend in a zigzag shape as shown in FIG. 10C, the direction of the air flow can be forced to change continuously. Another example of the fin type capable of continuously changing the direction of the air flow is, though not shown, a louver fin.

When the direction of the air flow changes continuously, the liquid droplets turn corners at larger radiuses due to a difference in momentum between gaseous molecules and the liquid droplets, and collisions of the liquid droplets against the fin members are promoted. Upon colliding against the fin members, the liquid droplets are given with shearing forces from the air flow and then flow in the form of liquid films. At this time, because the fin members are subjected to the heat from the exhaust gas serving as the heating fluid, the temperature of the fin members is higher than that of the compressed air. Therefore, the temperature of the liquid films becomes higher than that of the liquid droplets, and the steam pressure on the liquid film rises correspondingly. As a result, the difference in steam pressure between the compressed air and the liquid films increases, which increases an amount of material diffusion and hence promotes evaporation. The inventors studied such a process with numerical simulation and confirmed it quantitatively. The numerical simulation was performed by using the same fin and other conditions as those listed in Table 1 and by assuming a diameter of the sprayed liquid droplets to be 30 mm. Temperatures and flow rates were set to the same conditions as those in the advanced humid air turbine power system of this embodiment.

Figure 15A:
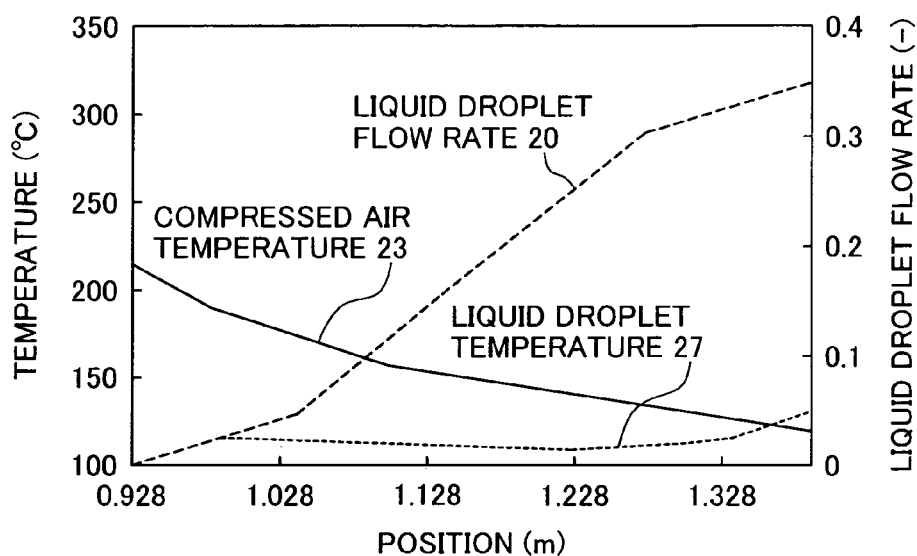
FIGS. 15A and 15B are each a graph showing calculation results of distributions of temperature and liquid phase water within the plate-fin type regenerative heat exchanger.

FIG. 15A plots local distributions of a compressed air temperature indicated by 23, a liquid droplet temperature indicated by 27, and a liquid droplet flow rate indicated by 20 within the corrugated fin channel 53 when the sprayed liquid droplets evaporate thoroughly while remaining in the state of liquid droplets without colliding against any members. The horizontal axis of FIG. 15A represents a position in the corrugated fin channel 53. A right end of the horizontal axis corresponds to an inlet for the compressed air, and a left end corresponds to an outlet for the compressed air. The vertical axis on the left side of FIG. 15A represent a temperature, and the vertical axis on the right side represents a liquid droplet flow rate as a relative value on the basis of the total amount of the liquid droplets sprayed from the water spraying devices 40, 42 and 44. Referring to FIG. 15A, the liquid droplets flow to the left from the right end position as viewed on the graph and evaporate while taking off latent heat from the compressed air by utilizing, as driving forces for developing diffusion, the difference in steam pressure between the compressed air and the liquid droplet surfaces. The liquid droplet temperature 27 approaches a liquid droplet equilibrium temperature that is determined depending upon the humidity of the compressed air and a ratio of material transfer to heat transfer. Under the conditions of this embodiment, the liquid droplet equilibrium temperature is about 110° C. that is lower than the temperature of the compressed air. As the compressed air temperature 23 rises with the progress of heat exchange, the saturated steam pressure increases and therefore evaporation of the liquid droplets continues. Then, the liquid droplet flow rate 20 reduces to perfectly zero just before the outlet of the corrugated fin channel 53.

Figure 15B:
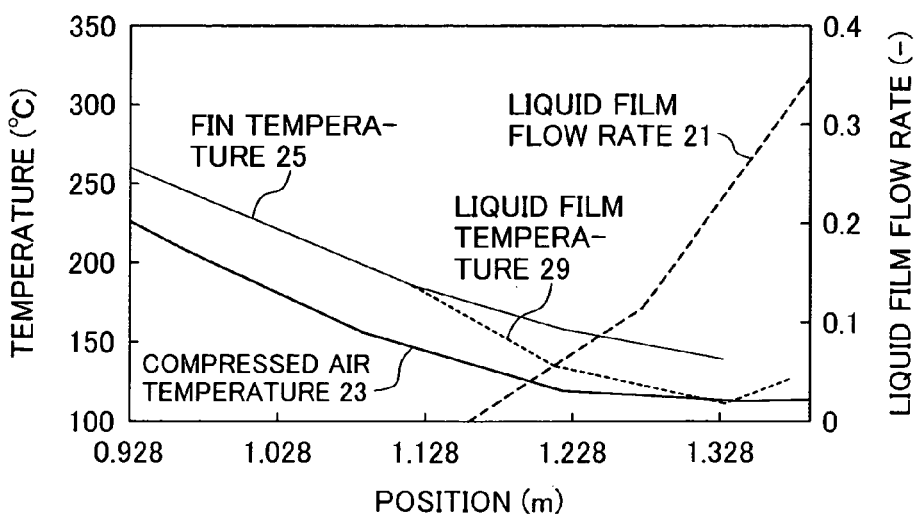

FIG. 15B plots local distributions of a compressed air temperature indicated by 23, a fin temperature indicated by 25, a liquid film temperature indicated by 29, and a liquid film flow rate indicated by 21 within the corrugated fin channel 53 when the sprayed liquid droplets are assumed to collide against the fin members as soon as they flow into the corrugated fin channel 53, followed by flowing downward in the form of liquid films. The vertical axis and the horizontal axis of FIG. 15B represent the same variables as those in FIG. 15A except for that the vertical axis on the right side represents a liquid film flow rate instead of a liquid droplet flow rate. The liquid film temperature 29 is determined depending upon balance between latent heat absorbed with phase change on the liquid film surfaces and forced convection heat transfer between the liquid films and the compressed air. Referring to FIG. 15B, the liquid film temperature 29 takes a value between the fin temperature 25 and the compressed air temperature 23, and is higher than the liquid droplet temperature 27 plotted in FIG. 15A, thus resulting in a higher steam pressure on the liquid film surfaces. Because evaporation occurs by utilizing, as driving forces for developing diffusion, the difference in steam pressure between the humid compressed air and the liquid film surfaces, the liquid films evaporate at a higher rate than evaporation of the liquid droplets plotted in FIG. 15A. Hence, the liquid film is perfectly evaporated nearly at a center of the corrugated fin channel 53.

Taking into account the above-described results of the numerical simulation, in this embodiment, the fin type capable of continuously changing the direction of the air flow was selected as each of the corrugated fin channels 53, 54 for colliding the liquid droplets against the fin members to bring them into a liquid film state so that evaporation of the liquid droplets is promoted. The reason why the serrated fin 91 was employed in the corrugated fin channel 56 for the exhaust gas and the reason why the plain fin 92 was employed in each of the distribution fin channels 51, 52 are the same as those in the above-described embodiment.

The reasons why the fin pitch of the corrugated fin channel 53 was set to a larger value is, as in the above-described embodiment, to prevent bridging of the liquid droplets. In the serrated fin, because adjacent fin rows are arranged at a ½-pitch shift between them, the flow passage is narrowest at a boundary portion between the adjacent fin rows. In consideration of that the narrowest boundary portion has a width substantially equal to the capillary length determined in the above-described embodiment, the fin pitch was set to 5 mm, i.e., about twice the capillary length, in this embodiment. Further, although the fin thickness of the narrowest boundary portion is desirably increased to the extent possible in consideration of erosion resistance, it was set to 0.3 mm from the viewpoint of easiness in pressing for the reason of employing the serrated fin having a complicated shape unlike the above-described embodiment.

The temperature at a division position at which the corrugated fin channels 53 and 54 are partitioned from each other was set to about 220° C. under the conditions of this embodiment. Since this temperature condition differs depending upon the pressure ratio of the gas turbine system, the injection rate of moisture into the compressed air, etc., the basis for determining the temperature condition will be described below. Even when the specifications of the gas turbine system, etc. differ from those in this embodiment, an optimum temperature at the division position can be determined by the following method.

First, the length of the corrugated fin channel 53 in the flow direction is assumed to take, e.g., ten different values. Then, for each of the assumed lengths, the length of the corrugated fin channel 54 is calculated at which a total required amount of heat to be exchanged can be obtained. For each case, the temperature of the humid compressed air at the boundary between the corrugated fin channels 53 and 54 is determined, and the flow rate of the liquid droplets flowing from the corrugated fin channel 53 to the corrugated fin channel 54 through the boundary therebetween is determined. The relationship between the thus-determined values of the temperature and the flow rate is plotted in FIG. 16A. As seen from FIG. 16A, by setting the temperature at the division position to about 220° C., the liquid droplets can be prevented from flowing out of the corrugated fin channel 53. Also, FIG. 16B shows the relationships of the temperature at the division position versus the length of the corrugated fin channel 53, the length of the corrugated fin channel 54, and the total length which are necessary for obtaining the required amount of heat to be exchanged. When the temperature at the division boundary is high, the length of the corrugated fin channel 53 having a large fin pitch increases, while the length of the corrugated fin channel 54 having a small fin pitch decreases. Hence, as seen from FIG. 16B, the total length of both the corrugated fin channels increases. In order to minimize the total length, the temperature at the division position is desirably set to a value not exceeding 220° C. so much.

It is also found from FIG. 16B that, even with the temperature at the division position increasing, an increase of the overall size is relatively moderate. The reason is as follows. The thermal conductivity of compressed air having a large fluid density is larger than that of exhaust gas. Looking at the entirety of a heat transfer path from the exhaust gas to the compressed air, therefore, there is a tendency that the forced convection heat transfer rate on the compressed air side is larger than that on the exhaust gas side. As a result, a main part of overall heat resistance is occupied by heat resistance on the exhaust gas side. In such a condition, influence acting on the overall heat resistance is small even when the heat resistance of the compressed air side occupying a small percentage of the overall heat resistance is changed. In other words, even with the fin pitch on the compressed air side increasing, influence acting on overall heat transfer characteristics is small. Accordingly, even when the temperature at the division position is increased and all of the fins are constructed using the channels having large fin pitches, this embodiment can be implemented without losing the advantages thereof in substance. Such a construction is equivalent to the case in which the corrugated fin channel 53 and the corrugated fin channel 54 are both constructed using the channels having large fin pitches.

Thus, so long as the fin pitch of the corrugated fin channel 53 satisfies the above-mentioned "condition not causing the bridging of the liquid phase water", the relationship regarding values of the pitch of the corrugated fin channel 54 and the pitch of the corrugated fin channel 53 is not necessarily required to satisfy the relationship that the pitch of the fin members installed in the first region is set larger than the pitch of the fin members installed in the second region. Also, since the partition between the corrugated fin channels 53 and 54 is a functional partition determined depending upon the presence or absence of the liquid phase water, both the corrugated fin channels may be constructed as fins having exactly the same shape, dimensions and material. Setting the pitch of the corrugated fin channel 54 to be the same as the pitch of the corrugated fin channel 53 is advantageous in that neither fabrication nor assembly of fins having different specifications for each region are required in manufacturing of the heat exchanger, the manufacturing process can be simplified, and the cost can be reduced. Further, when the pitch of the corrugated fin channel 54 is large, a temperature gradient in the flow direction is moderate and therefore the use of the corrugated fin channel 53 having a large pitch is advantageous from the viewpoint of thermal stresses acting on the heat exchanger core.

Figure 16A:
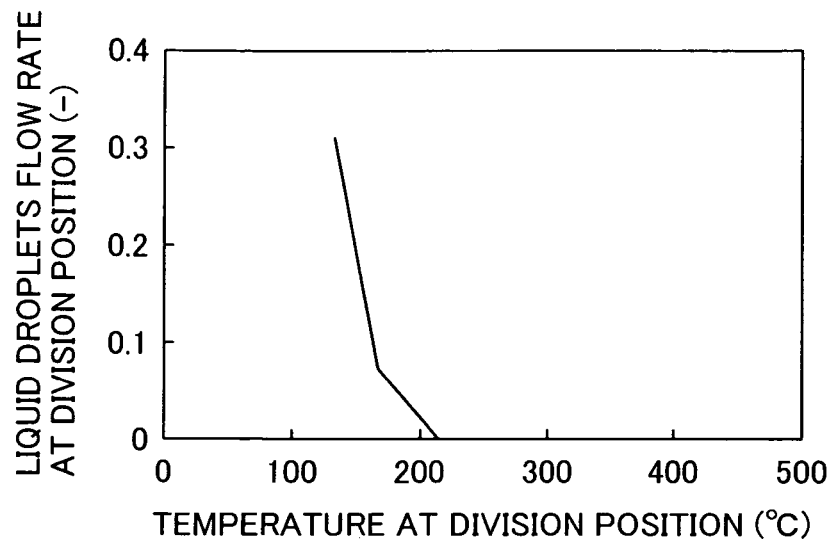
FIGS. 16A and 16B are graphs showing respectively the relationship between a temperature at a division position and a liquid film flow rate and the relationship between the temperature at the division position and a heat transfer element length.
Figure 16B:
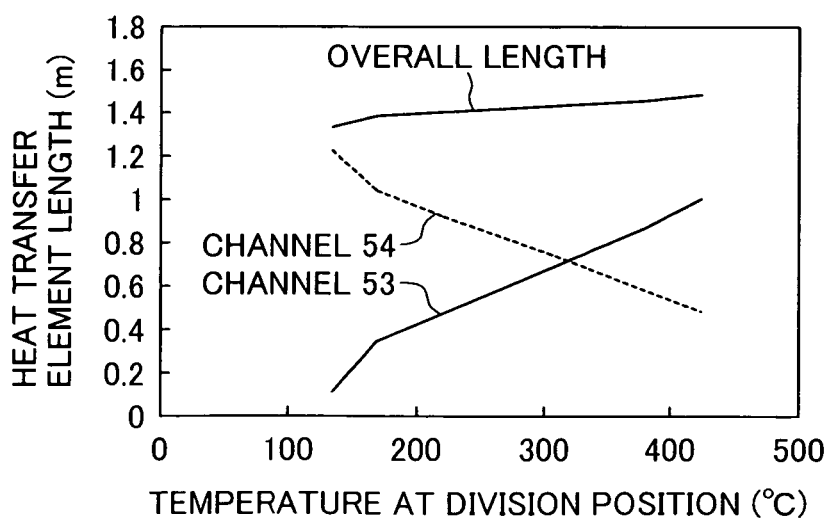

Moreover, the computation made for obtaining the graph of FIG. 16A takes into account evaporation of only the liquid droplets. If the liquid droplets are transformed into the liquid films halfway, the position where the evaporation is completed shifts toward a more upstream position. Accordingly, by setting the temperature at the division position to be not lower than 220° C., the liquid films are prevented from flowing into the corrugated fin channel 54.

The basis for determining specifications of the other components is the same as that in the above-described embodiment. The construction of an advanced humid air turbine power system employing the plate-fin type regenerative heat exchanger 61 of this embodiment is also the same as that in the case employing the above-described embodiment except that the circulating pump 75 is omitted corresponding to the omission of the drain pipe 77.

The operation of the plate-fin type regenerative heat exchanger 61 according to this embodiment will be described below with reference to FIG. 13.

The compressed air supplied through the compressed air inlet port 66 is subjected to spray of small liquid droplets from the water spraying device 44. In this spray, the small liquid droplets are sprayed at a moisture level exceeding the saturated steam pressure at the temperature in the spray position. Therefore, the sprayed liquid droplets are not all evaporated and a part thereof flows into the distribution fin channel 51 while remaining in the state of liquid droplets. In the distribution fin channel 51, the compressed air is heated and the saturated steam pressure increases correspondingly. At the same time, the liquid droplets take off heat from the compressed air and evaporate from their surfaces, whereby diameters of the liquid droplets decrease and a part of the liquid droplets is perfectly evaporated. The liquid droplets having not perfectly evaporated are forced to change the flow direction at the outlet of the distribution fin channel 51 at a right angle toward the corrugated fin channel 53. On that occasion, a part of the liquid droplets collides against the fin members of the corrugated fin channel 53 near the corner and transforms into liquid films. The liquid films flow while receiving shearing forces from the compressed air flow. Then, the compressed air is heated through forced convection heat transfer with respect to the heat transfer surfaces, and the saturated steam pressure increases. Therefore, the liquid films are gradually evaporated from their surfaces and are finally perfectly evaporated within the corrugated fin channel 53. The small liquid droplets having not transformed into the liquid films flow while being carried on the compressed air. As the saturated steam pressure of the compressed air increases with heating, those small liquid droplets take off heat from the compressed air to evaporate from their surfaces while reducing the diameters thereof. Finally, all the small liquid droplets are also perfectly evaporated within the corrugated fin channel 53.

The humid compressed air, which has been heated in the corrugated fin channel 53 and from which the liquid phase water has perfectly evaporated, is subjected to heat exchange with respect to the high-temperature exhaust gas in the corrugated fin channel 54 having the small fin pitch and the large heat transfer surface area. After being heated up to about 600° C., the humid compressed air changes its direction at a right angle while flowing into the distribution fin channel 52 and is taken out through the compressed air outlet port 68 formed at the side. The subsequent operation is the same as that of the advanced humid air turbine power system according to the above-described embodiment.

This embodiment is featured by heat exchange between the compressed air and the exhaust gas in the counterflow arrangement. This feature is advantageous in realizing higher temperature efficiency than that realized with the above-described embodiment in which the corrugated fin channel 53 has the orthogonal flow arrangement. Another advantage is that, since the drain pipe 77 is not disposed midway the flow passage and the plate-fin type regenerative heat exchanger of this embodiment has an entire shape similar to that of the conventional one, problems with manufacturing are lessened.

When employing the plate-fin type regenerative heat exchanger 61 shown in FIG. 13, however, because the liquid droplets pass the distribution fin channel 51 before entering the corrugated fin channel 53, there is a possibility, as described above, that many liquid films are generated near the corner between those two channels and the temperature distribution in the corrugated fin channel 53 becomes uneven. To cope with that problem, due care must be paid in design in a point of, for example, planning the heat transfer surface area with a sufficient margin.

Figure 14A:
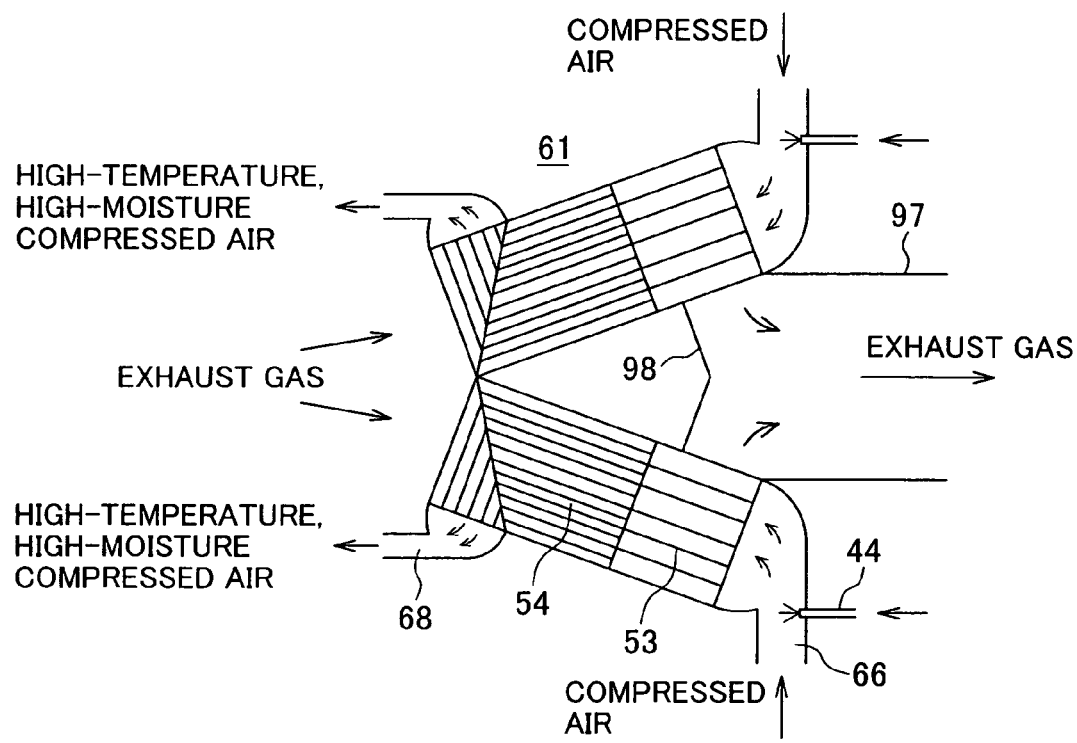
FIGS. 14A and 14B are horizontal sectional views of a plate-fin type regenerative heat exchanger according to a modification of still another embodiment, the former view showing a combined state.
Figure 14B:
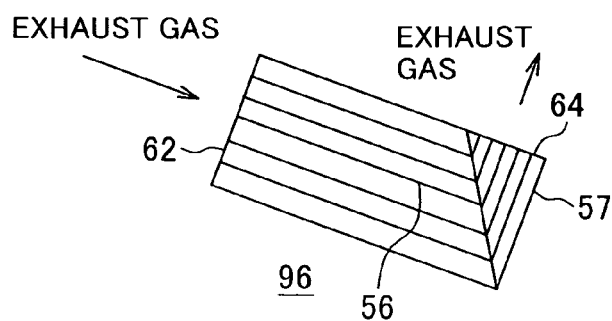

In this embodiment, the plate-fin type regenerative heat exchanger 61 shown in FIG. 13 may be replaced with a plate-fin type regenerative heat exchanger 61 shown in FIG. 14. FIG. 14A is a horizontal sectional view showing the case in which two blocks of the plate-fin type regenerative heat exchangers 61 are combined in a bilaterally symmetrical structure, and showing a channel arrangement of the heated fluid flow passages 95. FIG. 14B is a horizontal sectional view showing a channel arrangement of one unit of the heating fluid flow passage 96. As in the heat exchanger shown in FIG. 13, the heated fluid flow passage 95 and the heating fluid flow passage 96 are alternately stacked in the vertical direction. This modification differs from the embodiment of FIG. 13 in that, as seen from FIG. 14A, the compressed air supplied through the compressed air inlet port 66 flows substantially linearly into the corrugated fin channel 53 without passing the distribution fin channel. On the other hand, the flow passage on the exhaust gas side is constructed, as shown in FIG. 14B, such that a distribution fin channel 57 is installed downstream of the corrugated fin channel 56 to which the exhaust gas is introduced through the exhaust gas inlet port 62, thereby changing the flow direction of the exhaust gas, and the exhaust gas is taken out through the exhaust gas outlet port 64 opened in the side of the heat exchanger block. The exhaust gas outlet port 64 is connected to a space formed by a closing member 98 and a duct 97, and the space is connected to an exhaust gas inlet port of the economizer 49 not shown in FIG. 14.

The operation of the heat exchanger shown in FIG. 14 differs from that shown in FIG. 13 as follows. Because humid air containing liquid droplets flows substantially linearly into the corrugated fin channel 53 without passing the distribution fin channel, distributions of temperature and liquid droplets or liquid films become more uniform in the width direction of the channel, and perfect evaporation of the liquid phase water is completed substantially at the same position in the flow direction. For the flow passage of the exhaust gas, the flow direction is changed at a right angle by the distribution fin channel 57 installed downstream of the corrugated fin channel 56. The pressure loss on the exhaust gas side is, therefore, increased as compared with the heat exchanger shown in FIG. 13.

While the two embodiments described above with reference to FIGS. 7 to 14 are premised on that the makeup water is externally supplied, moisture may recovered for reuse from the exhaust gas containing a large amount of moisture. Such a modification is advantageous in that the advanced humid air turbine power system according to any of the embodiments can be installed even in a place where there are restrictions on water resources. On the other hand, that modification increases the equipment cost because of the necessity of water recovery equipment, and reduces the power generation efficiency because motive power and thermal energy are required for the water recovery.

Also, while, in the above-described embodiments of the present invention, air is humidified by spraying small water droplets into the air from all of the water spraying devices 40, 42 and 44, the humidifying method can be modified as required. The water spraying device 40 may be of the type evaporating moisture from the wetted surface of a humidifying member, or using an ultrasonic vibrator for humidification. The water spraying device 42 may be of the type causing a liquid film to flow down over filler surfaces, or injecting steam generated by utilizing exhaust heat. However, the humidifying method of causing a liquid film to flow down over filler surfaces requires a pressure vessel for containing fillers, and the humidifying method of injecting steam consumes thermal energy and hence reduces the power generation efficiency.

Further, the present invention is applicable to the case in which one of the water spraying devices 40 and 42 is omitted. In the case of omitting the water spraying device 40, however, because air taken in by the compressor 10 is not cooled, a power reduction of the compressor cannot be achieved and the effect of increasing the power generation efficiency is reduced correspondingly. Also, in the case of omitting the water spraying device 42, a proportion of moisture to be injected from the water spraying device 44 is increased, and therefore severer conditions must be satisfied to uniformly distribute the liquid phase water in the corrugated fin channel 53. The reason resides in that, when the water spraying device 42 is omitted, the temperature of the compressed air supplied to the compressed air inlet port 66 is higher than that of the exhaust gas, and the compressed air residing in areas not humidified due to uneven distribution of the liquid droplets flows into the corrugated fin channel 53 while remaining at the higher temperature, whereby areas not contributing to the heat exchange are generated.

The plate-fin type regenerative heat exchangers having the above-described structures are effective in reducing the equipment cost of the heat exchanger required for heating the compressed air containing a large amount of moisture, and in making the heat exchanger as compact as possible. It is also possible to realize a regenerative heat exchanger, which can suppress an increase of pressure loss and clogging due to a drift of the liquid phase water, can reduce an influence of scales generated with evaporation of the liquid phase water, can promote evaporation of the liquid droplets, can provide means for draining the liquid phase water passing the heat exchanger without evaporating, and can retard corrosion of the heat transfer surfaces. Further, an advanced humid air turbine power system having higher power generation efficiency can be provided by employing any of the plate-fin type regenerative heat exchangers.

According to the embodiments described above, the plate-fin type regenerative heat exchanger can be realized in which the fin pitch is set so as not to cause bridging of liquid droplets between fin members, and therefore clogging of the flow passage due to a drift of liquid phase water can be prevented.

What is claimed is:

1. A plate fin type recuperator for heating humid compressed air containing liquid phase water by combustion exhaust gas,
    wherein a pitch of fin members forming a channel for the compressed air is set to the Laplace length.

2. A plate fin type recuperator for heating humid compressed air containing liquid phase water by combustion exhaust gas with a combustion exhaust gas channel and a compressed air channel partitioned from each other by a tube plate,
    wherein a pitch of fin members and a height of said fin members forming the compressed air channel are set to values sufficient to prevent the liquid phase water contained in the compressed air from bridging between adjacent two of said fin members or tube plates under action of surface tension.

3. A plate fin type recuperator for heating humid compressed air containing liquid phase water by combustion exhaust gas,
    wherein said recuperator comprises a first region for heating the humid compressed air containing liquid phase water and a second region for heating the humid compressed air from which the liquid phase water has evaporated in the first region, and
    a pitch of fin members disposed in the first region is set to the Laplace length.

4. A plate fin type recuperator for heating humid compressed air containing liquid phase water by combustion exhaust gas,
    wherein said recuperator comprises a first region for heating the humid compressed air containing liquid phase water and a second region for heating the humid compressed air from which the liquid phase water has evaporated in the first region, and
    a pitch of fin members and a height of said fin members installed in said first region are set to values sufficient to prevent the liquid phase water contained in the compressed air from bridging between adjacent two of said fin members or tube plates under action of surface tension.

5. A plate fin type recuperator according to claim 3,
    wherein side plates mounted to upper and lower surfaces of a heat exchanger core, spacer bars mounted to corresponding ends of a compressed air channel and a combustion exhaust gas channel, and/or covers for housing said heat exchanger core are provided with joints making said heat exchanger core separable at a boundary between the first region and the second region.

6. A plate fin type recuperator according to claim 3,
    wherein the channel for the compressed air flowing through said plate fin type recuperator has no bending portions, from a macroscopic point of view, in a channel within the first region.

7. A plate fin type recuperator according to claim 3,
    wherein the channel for the compressed air flowing through said plate fin type recuperator includes, at a certain position downstream of the first region, a pipe for guiding the liquid phase water entrained with the compressed air to the exterior of said recuperator.

8. A plate fin type recuperator according to claim 3,
    wherein the channel for the compressed air flowing through said plate fin type recuperator includes, at a certain position downstream of the first region, a separator for capturing and separating the liquid phase water entrained with the compressed air.

9. A plate fin type recuperator according to claim 3,
    wherein the fin members disposed in the first region and forming the compressed air channel have shapes giving continuous changes to the flow direction of the compressed air and promoting collision of liquid droplets entrained with the compressed air against said fin members.

10. A plate fin type recuperator according to claim 9,
    wherein said fin members are constituted as successively arranged fins each of which has a zigzag ridge shape or which have ridges alternately shifted at a half-pitch in positions.

11. A gas turbine power system comprising a compressor for compressing air, a combustor for combusting the air compressed by said compressor and fuel, a turbine driven by combustion gas produced in said combustor, a recuperator for performing heat exchange between exhaust gas exhausted from said turbine and the compressed air supplied to said combustor from said compressor, and a humidifier for supplying liquid phase water to the compressed air supplied from said compressor,
    wherein said recuperator is a plate fin type recuperator for heating humid compressed air containing liquid phase water by combustion exhaust gas, and a pitch of fin members forming a compressed air channel is set to the Laplace length.

12. A gas turbine power system comprising a compressor for compressing air, a combustor for combusting the air compressed by said compressor and fuel, a turbine driven by combustion gas produced in said combustor, a recuperator for performing heat exchange between exhaust gas exhausted from said turbine and the compressed air supplied to said combustor from said compressor, and a humidifier for supplying liquid phase water to the compressed air supplied from said compressor, wherein said recuperator is a plate fin type recuperator for heating humid compressed air containing liquid phase water by combustion exhaust gas with a combustion exhaust gas channel and a compressed air channel partitioned from each other by a tube plate, and a pitch of fin members and a height of said fin members forming the compressed air channel are set to values sufficient to prevent the liquid phase water contained in the compressed air from bridging between adjacent two of said fin members or tube plates under action of surface tension.

* * * * *

UNITED STATES PATENT AND TRADEMARK OFFICE
CERTIFICATE OF CORRECTION

PATENT NO. : 7,251,926 B2  Page 1 of 1
APPLICATION NO. : 10/874394
DATED : August 7, 2007
INVENTOR(S) : Shibata et al.

It is certified that error appears in the above-identified patent and that said Letters Patent is hereby corrected as shown below:

On the Title Page Item (63) should read,

(63) Continuation-in-part of application No. 10/674,402, filed on Oct. 1, 2003, now Pat. No. 6,772,596, which is a division of 10/080,556, filed on Feb. 25, 2002, now Pat. No. 6,718,750.

Signed and Sealed this

Fourth Day of December, 2007

JON W. DUDAS
*Director of the United States Patent and Trademark Office*